US012133067B2

(12) United States Patent
Chitrakar et al.

(10) Patent No.: US 12,133,067 B2
(45) Date of Patent: *Oct. 29, 2024

(54) COMMUNICATION APPARATUS AND METHOD FOR SECURE LOW POWER TRANSMISSION

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,543

(22) Filed: Jul. 18, 2023

(65) Prior Publication Data
US 2023/0362634 A1 Nov. 9, 2023

Related U.S. Application Data

(63) Continuation of application No. 18/149,607, filed on Jan. 3, 2023, now Pat. No. 11,751,048, which is a (Continued)

(30) Foreign Application Priority Data

Nov. 2, 2017 (JP) .................................. 2017-212884

(51) Int. Cl.
*H04W 12/10* (2021.01)
*H04W 12/037* (2021.01)
(Continued)

(52) U.S. Cl.
CPC ......... *H04W 12/037* (2021.01); *H04W 12/04* (2013.01); *H04W 12/106* (2021.01); *H04W 52/0235* (2013.01)

(58) Field of Classification Search
CPC . H04W 12/037; H04W 12/04; H04W 12/106; H04W 52/0235; H04W 12/71;
(Continued)

(56) References Cited

U.S. PATENT DOCUMENTS 9,763,063 B2 * 9/2017 Kumar .................... H04W 4/80
2007/0264954 A1 * 11/2007 Qi ......................... H04W 68/00
455/186.1

(Continued)

FOREIGN PATENT DOCUMENTS

WO 2014/176979 A1 11/2014

OTHER PUBLICATIONS

Abedi et al., "MAC and Security Baseline Proposal—Normative Text", IEEE P802.15 Working Group for Wireless Personal Area Networks (WPANs), Mar. 16, 2010, 127 pages.
(Continued)

*Primary Examiner* — Khalid M Almaghayreh
(74) *Attorney, Agent, or Firm* — Seed IP Law Group LLP

(57) ABSTRACT

Provided is a communication apparatus comprising a cryptographic circuitry which, in operation, uses a shared cryptographic secret Key and a cryptographic salt to generate a cryptographically encoded Message Integrity Code (MIC) that is computed over the address field of a Wake Up Radio (WUR) frame, and a transmission signal generator which, in operation, generates a secure WUR signal by replacing the address field of the WUR frame with the MIC, and a transmitter which, in operation, transmits the secure WUR signal.

18 Claims, 29 Drawing Sheets

Related U.S. Application Data continuation of application No. 16/614,821, filed as application No. PCT/JP2018/016081 on Apr. 19, 2018, now Pat. No. 11,601,804.

(60) Provisional application No. 62/520,452, filed on Jun. 15, 2017.

(51) Int. Cl.
*H04W 12/04* (2021.01)
*H04W 12/106* (2021.01)
*H04W 52/02* (2009.01)

(58) Field of Classification Search
CPC . H04W 84/12; H04W 88/06; H04W 52/0219; H04W 52/0216; H04W 52/0229; H04L 9/0833; H04L 2209/80; H04L 9/3242; H04L 9/3297; Y02D 30/70
See application file for complete search history.

(56) References Cited

U.S. PATENT DOCUMENTS

| | | | | |
|---|---|---|---|---|
| 2012/0110331 | A1* | 5/2012 | Falk | H04W 52/0229 713/168 |
| 2012/0184205 | A1* | 7/2012 | Luft | H04W 68/00 455/9 |
| 2012/0289192 | A1* | 11/2012 | Abraham | H04L 1/0072 455/410 |
| 2014/0064486 | A1* | 3/2014 | Abraham | H04W 12/03 380/270 |
| 2014/0351598 | A1 | 11/2014 | Abraham et al. | |
| 2016/0057703 | A1* | 2/2016 | Benoit | H04W 56/00 370/311 |
| 2016/0337783 | A1* | 11/2016 | Seok | H04L 1/16 |
| 2017/0099662 | A1 | 4/2017 | Thubert et al. | |
| 2017/0134943 | A1* | 5/2017 | Min | H04W 12/04 |
| 2018/0018185 | A1* | 1/2018 | Sun | G06F 21/44 |
| 2018/0063788 | A1* | 3/2018 | Yang | H04W 12/108 |
| 2018/0234918 | A1* | 8/2018 | Asterjadhi | H04W 52/0216 |
| 2019/0069176 | A1 | 2/2019 | Huang et al. | |
| 2019/0268847 | A1* | 8/2019 | Asterjadhi | H04W 52/0216 |
| 2020/0196241 | A1* | 6/2020 | Lou | H04W 52/0229 |

OTHER PUBLICATIONS

Asterjadhi et al., "Considerations on WUR frame format", Qualcomm Inc., San Diego, CA, Jul. 4, 2017, doc.: IEEE 802.11-17/1004r4, 26 pages.

A. T. Capossele, V. Cerva, C. Petrioli and D. Spenza, "Counteracting Denial-of-Sleep Attacks in Wake-up-Radio-Based Sensing Systems," 2016 13th Annual IEEE International Conference on Sensing, Communication, and Networking (SECON), 2016, pp. 1-9, doi: 10.1109/SAHCN.2016.7732978. (Year: 2016).

Ching-Tsung Hsueh et al., "A Secure Scheme Against Power Exhausting Attacks in Hierarchical Wireless Sensor Networks", IEEE Sensors Journal, vol. 15, No. 6, Feb. 3, 2015.

Communication pursuant to Article 94(3) EPC dated May 3, 2021, for the corresponding European Patent Application No. 18817570.7, 7 pages.

The Extended European Search Report dated May 20, 2020 for the corresponding European Patent Application No. 18817570.7, 10 pages.

IEEE 802.11-16/0722r1, "Proposal for Wake-Up Receiver (WUR) Study Group", May 18, 2016.

IEEE 802.11-17/0575r2, "Specification Framework for TGba", Aug. 7, 2017.

IEEE 802.11-17/0660r0, "WUR Security Proposal", May 8, 2017.

IEEE Std 802.11(TM)-2016, IEEE Standard for Information technology—Telecommunications and information exchange between systems, Local and metropolitan area networks—Specific requirements Part 11: Wireless LAN Medium Access Control (MAC) and Physical Layer (PHY) Specifications, Dec. 14, 2016.

International Search Report of PCT application No. PCT/JP2018/016081 dated Jul. 3, 2018.

Liwen Chu, Marvell, "WUR MAC and Wakeup Frame," doc.: IEEE 802.11-17/0437r0, Jan. 2017, 11 pages.

* cited by examiner

| OUI | Suite Type | Meaning |
|---|---|---|
| 00-0F-AC | 0 | Use group cipher suite |
| 00-0F-AC | 1 | SHA-1-128 |
| 00-0F-AC | 2 | SHA-256 |
| 00-0F-AC | 3 | SHA-384 |
| 00-0F-AC | 4 | CCMP-128 |
| 00-0F-AC | 5 | HMAC-MD5 |
| 00-0F-AC | 6 | BIP-CMAC-128 |
| 00-0F-AC | 7 | Reserved |
| 00-0F-AC | 8 | GCMP-128 |
| 00-0F-AC | 9 | GCMP-256 |
| 00-0F-AC | 10 | CCMP-256 |
| 00-0F-AC | 11 | BIP-GMAC-128 |
| 00-0F-AC | 12 | BIP-GMAC-256 |
| 00-0F-AC | 13 | BIP-CMAC-256 |
| 00-0F-AC | 14-255 | Reserved |
| Other OUI | Any | Vendor-specific |

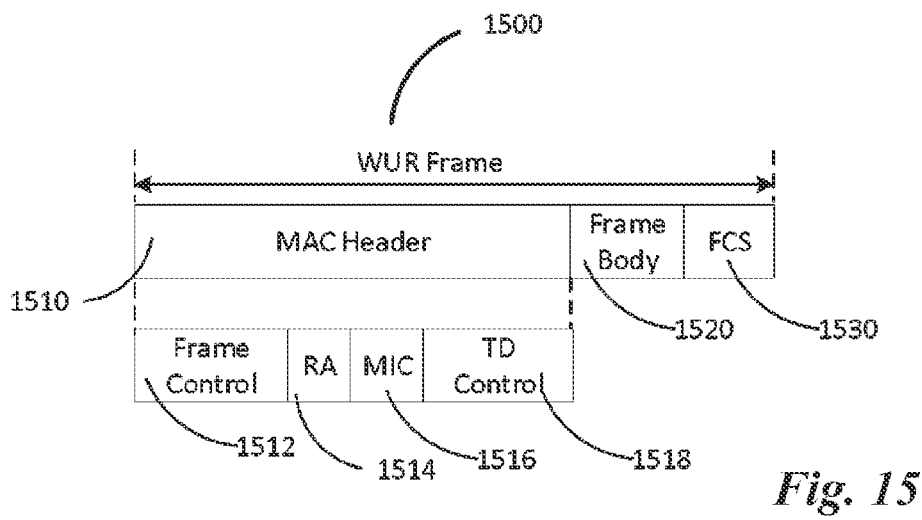
*Fig. 14*
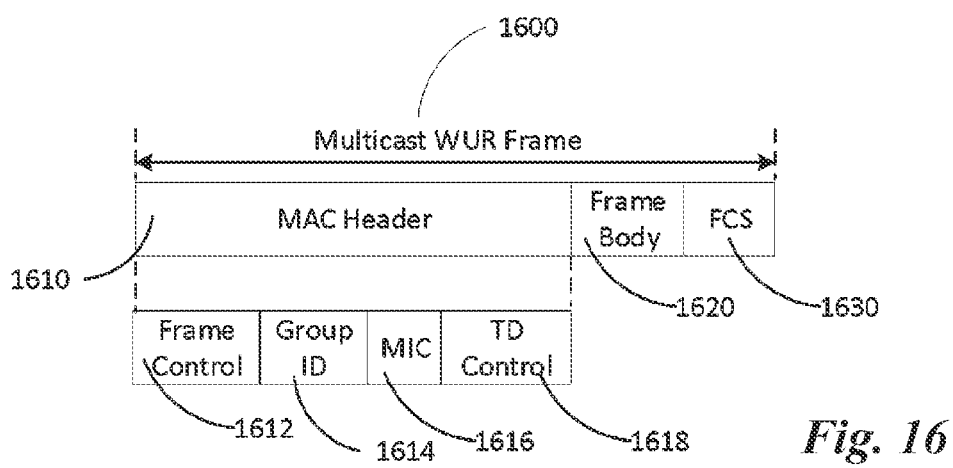
*Fig. 15*
*Fig. 16*

| Positive clock drift of +200ppm (STA clock is faster) ||||||
|---|---|---|---|---|---|
| AP's TSF ||| STA's TSF |||
| [0:7] | [8:15] | [16:23] | [0:7] | [8:15] | [16:23] |
|  | 248 | 200 |  | 255 | 200 |
|  | 249 | 200 |  | 0 | 201 |
|  | 250 | 200 |  | 1 | 201 |
|  | 251 | 200 |  | 2 | 201 |
|  | 252 | 200 |  | 3 | 201 |
|  | 253 | 200 |  | 4 | 201 |
|  | 254 | 200 |  | 5 | 201 |
|  | 255 | 200 |  | 6 | 201 |
|  | 0 | 201 |  | 7 | 201 |
| Negative clock drift of -200ppm (STA is slower) ||||||
| [0:7] | [8:15] | [16:23] | [0:7] | [8:15] | [16:23] |
|  | 255 | 200 |  | 247 | 200 |
|  | 0 | 201 |  | 248 | 200 |
|  | 1 | 201 |  | 249 | 200 |
|  | 2 | 201 |  | 250 | 200 |
|  | 3 | 201 |  | 251 | 200 |
|  | 4 | 201 |  | 252 | 200 |
|  | 5 | 201 |  | 253 | 200 |
|  | 6 | 201 |  | 254 | 200 |
|  | 7 | 201 |  | 255 | 200 |
|  | 8 | 201 |  | 0 | 201 |

*Fig. 19*

COMMUNICATION APPARATUS AND METHOD FOR SECURE LOW POWER TRANSMISSION

BACKGROUND

Technical Field

The present disclosure is generally related to a communication apparatus and a communication method.

Description of the Related Art

The IEEE (Institute of Electrical and Electronics Engineers) 802.11ba Taskgroup is currently in the process of standardizing wireless communication technologies related to the operations of a wake-up radio (WUR) apparatus. The WUR apparatus is a companion radio apparatus to the primary connectivity radio (PCR) apparatus and may operate in the same frequency band as the PCR or may also operate in a different frequency band. The PCR may be any of the existing mainstream IEEE 802.11 amendments (802.11a, 802.11g, 802.11n or 802.11ac) or even other applicable future amendments (e.g., 802.11ax). The purpose of the WUR apparatus is to trigger the transition of the PCR apparatus out of sleep upon reception of a valid wake-up packet (also known as WUR PHY Protocol Data Unit (PPDU)), while the PCR is used as the primary wireless communication radio. The PCR apparatus is only turned on during active communication, while during period of idle listening, the PCR apparatus is turned off and only the WUR apparatus is operating. The WUR apparatus is expected to have active receiver power consumption less than one milliwatt, which is much lesser compared to the active receiver power consumption of the PCR apparatus. Devices with a WUR apparatus may be called WUR devices and WUR mode may refer to operation mode where only the WUR is in operation while the PCR is turned off, while PCR mode may refer to operations with the PCR apparatus turned on.

The IEEE 802.11ba amendment is targeted at applications and Internet-of-Things (IOT) use cases in which the communication devices are usually powered by a battery and it is highly desirable to extend the battery lifetime while maintaining reasonably low latency.

CITATION LIST

Non Patent Literature

IEEE Std 802.11-2016
IEEE 802.11-17/0575r2, Specification Framework for TGba, July 2017
IEEE 802.11-16/0722r1, "Proposal for Wake-Up Receiver (WUR) Study Group"
IEEE 802.11-17/0660r0, "WUR Security Proposal"
Ching-Tsung Hsueh et. al., "A Secure Scheme Against Power Exhausting Attacks in Hierarchical Wireless Sensor Networks"

Patent Literature

US2017/0099662A1—Pascal Thubert et. al., "Dynamically hashed MAC address for transmission in a network"

BRIEF SUMMARY

Since much of the power saving for WUR devices is expected to be a result of the devices turning off the main PCR apparatus and staying in the WUR mode for extended period of time, unnecessary switching to the PCR mode is detrimental to the device's battery life. Due to the low data rates available for communication in the WUR mode, the WUR signal is expected to be much simpler and shorter as compared to the PCR signal. As a result, WUR signals are very easy to be captured and reproduced by malicious devices for ulterior motives. This makes WUR devices especially susceptible to replay attacks, whereby an attacker captures genuine WUR signals used by a central controller to wake up WUR devices and uses them in the future to falsely wake up the WUR devices with the intent of causing battery drainage. Such attacks may also be known as power exhausting attacks or denial of sleep attacks.

One non-limiting and exemplary embodiment of the present disclosure provides means for transmission and reception of secure WUR signals and prevent the above mentioned malicious attacks on WUR devices.

In one general aspect, the techniques disclosed here features: a communication apparatus comprising a cryptographic circuitry which, in operation, uses a shared cryptographic secret Key and a cryptographic salt to generate a cryptographically encoded Message Integrity Code (MIC) that is computed over the address field of a Wake Up Radio (WUR) frame; and a transmission signal generator which, in operation, generates a secure WUR signal by replacing the address field of the WUR frame with the MIC; and a transmitter which, in operation, transmits the secure WUR signal.

It should be noted that general or specific embodiments may be implemented as a system, a method, an integrated circuit, a computer program, a storage medium, or any selective combination thereof.

The communication apparatus and communication method described in the present disclosure provides means for transmission and reception of secure WUR signals and prevent false wake ups as a result of malicious attacks on WUR devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 14 is a table of example MIC values as per the fifth embodiment.

FIG. 15 shows the frame format proposed for secure WUR frames as per the fifth embodiment.

FIG. 16 shows the frame format proposed for secure multicast WUR frames as per the fifth embodiment.

FIG. 19 is a table of an example clock drift issue that may occur when P-TSF is used for time synchronization.

DETAILED DESCRIPTION

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

Figure 1:
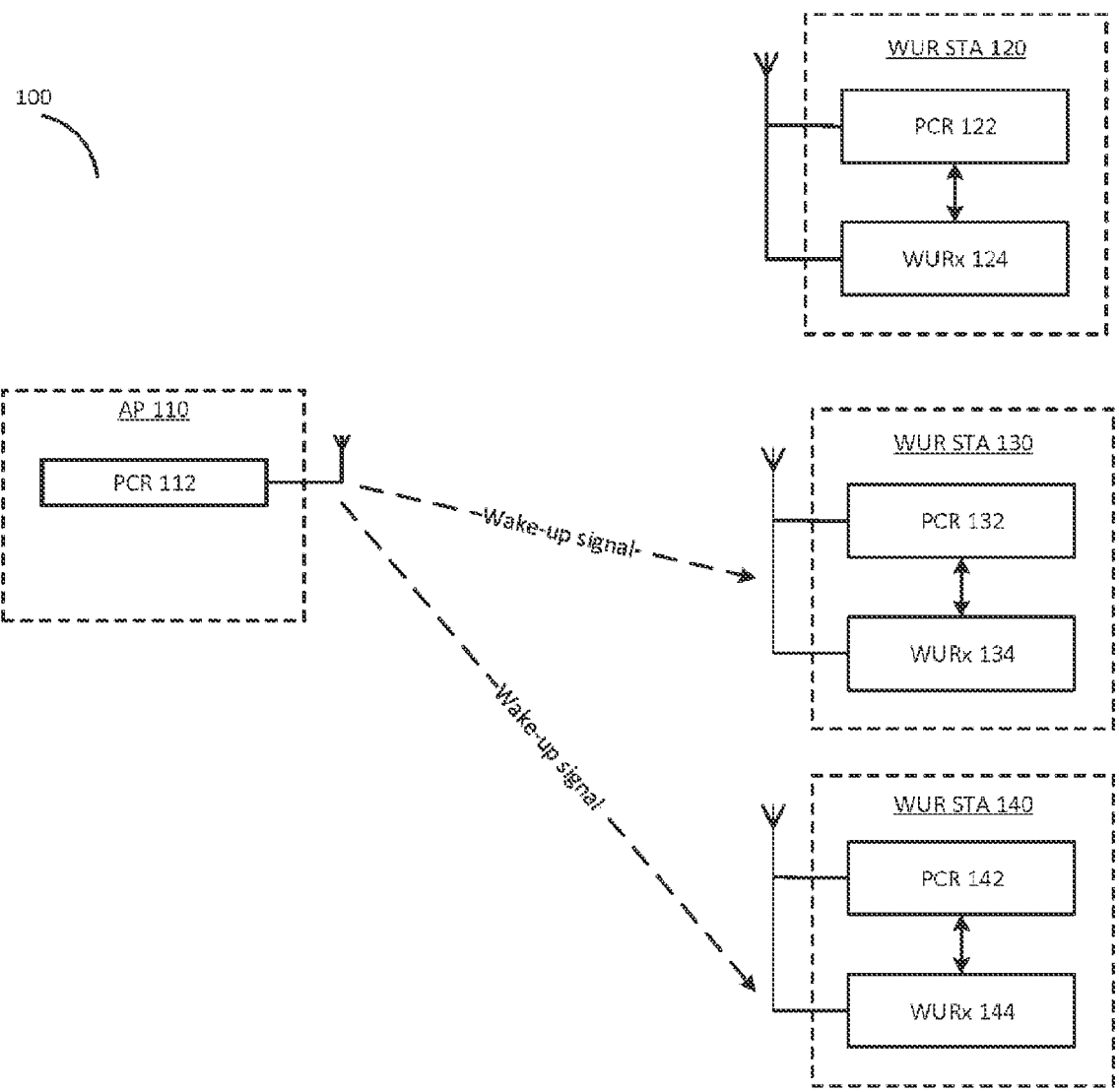
FIG. 1 shows an example heterogeneous 802.11 wireless network with a mixture of genuine and malicious WUR capable devices.

FIG. 1 shows an example of a wireless communication network 100 in which the present disclosure may be applied. The wireless communication may be based on popular wireless standards such as IEEE 802.11. The wireless communication network 100 may comprise an Access Point (AP) 110 and three stations (STA) 120, 130 and 140 associated with the AP 110. The AP 110 is equipped with a Primary Connectivity Radio (PCR) apparatus (hereinafter stated simply as "PCR") 112 which is capable of transmitting and receiving wireless signals in the 802.11 waveform (e.g., Orthogonal Frequency Division Multiplexing (OFDM)) as well as being capable of transmitting wireless signals in the Wake-up radio (WUR) waveform (e.g., On-Off Keying (OOK)). STAs 120, 130 and 140 are WUR capable STAs and are equipped with PCRs 122, 132 and 142 respectively as well as Wake-up radio receivers (WURx) apparatus (hereinafter stated simply as "WURx") 124, 134 and 144 respectively. STAs 130 and 140 are capable of transmitting and receiving 802.11 signals and are also capable of receiving WUR signals. The PCRs 132 and 142 may only be turned on during active communication (PCR mode), while during period of idle listening, the PCRs may be turned off and only the WURx 134 and 144 may be operating (WUR mode). STA 120 however may be a custom made device that has all the functionalities of a WUR capable STA and in addition its PCR 122 also has the ability to transmit wireless signals in the Wake-up radio (WUR) waveform (OOK). Or STA 120 may simply be a device that possesses both the WUR AP functionalities as well as the WUR STA functionalities. When the AP 110 needs to communicate with STAs operating in WUR mode, it may first transmit wake-up signal to instruct the STAs to transit to PCR mode by turning on the respective PCRs and switching off the WURx. Subsequently the AP and the STAs may perform communication over the PCR. Once the communication is over, the STAs may switch back to WUR mode by switching off the PCR and turning on the WURx.

Figure 2:
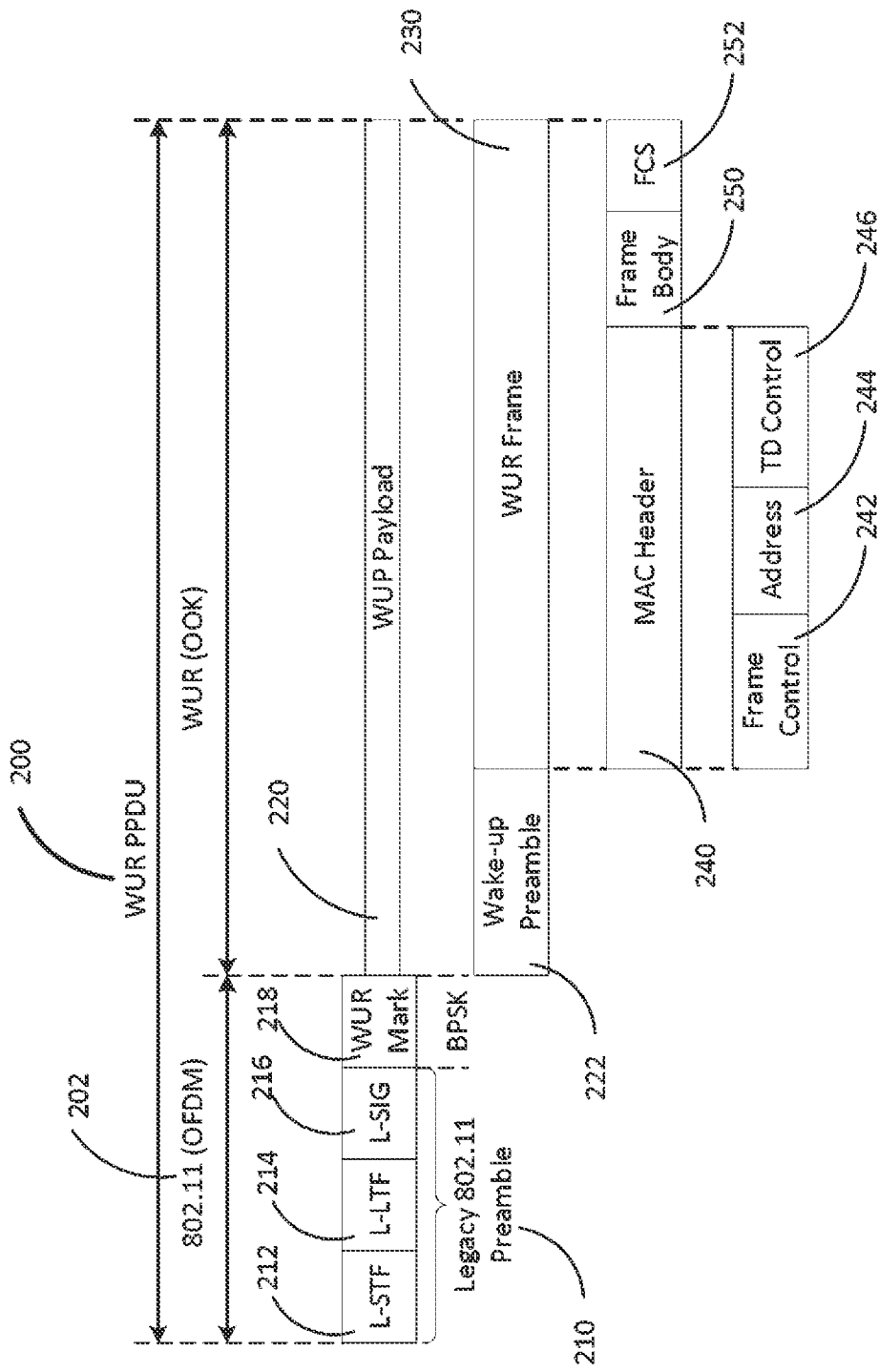
FIG. 2 shows the format of WUR PPDU being considered in the 802.11ba Taskgroup.

FIG. 2 shows the wake-up signal transmission scheme being considered in the IEEE 802.11ba Taskgroup. The wake-up signal may be represented as the WUR PHY Protocol Data Unit (PPDU) 200. The WUR PPDU 200 is composed of two distinct portions. The first portion is comprised of a 20 MHz legacy (also known as non-high-throughput (HT)) 802.11 preamble 210 and one extra OFDM symbol 218 called WUR Mark, which are transmitted in the 802.11 OFDM waveform over the entire 20 MHz channel. The second portion is the wake-up packet (WUP) payload 220 which is transmitted in a WUR OOK waveform in a narrower sub-channel within the 20 MHz channel, for example a 4 MHz sub-channel. Although only a single WUP Payload 220 is shown in FIG. 2, it is also possible that more than one, for example three WUP Payloads, are transmitted on different, non-overlapping sub-channels within the 20 MHz channel.

The legacy 802.11 preamble 210 provides coexistence with legacy 802.11 STAs that do not understand the WUR signals. Preamble 210 further comprises a non-HT Short Training Field (L-STF) 212, a non-HT Long Training Field (L-LTF) 214 and a non-HT SIGNAL field (L-SIG) 216. The L-SIG 216 carries information regarding the length of the WUP payload 220, allowing legacy 802.11 devices to defer their transmissions for the correct duration. The WUR Mark 218 of duration 4 micro-seconds modulated in Binary Phase Shift Keying (BPSK) is transmitted right after the L-SIG 216 to prevent 802.11n devices from wrongly decoding the WUR PPDU 200 as being an 802.11n packet.

The WUP Payload 220 carries the actual wake-up signal and comprises a wake-up preamble 222 and a WUR frame 230. The wake-up preamble 222 is used for automatic gain control (AGC), timing synchronization, packet detection, etc., while the WUR frame 230 carries the control information. The WUR frame 230 may also be known as a WUR MAC Protocol Data Unit (MPDU) and may be further composed of various sub-fields such as a MAC header 240, a Frame check sequence (FCS) 252 as well as the optional Frame body 250. The MAC header 240 may be further comprised of a Frame control field 242 that species the frame Type, frame length, etc., an Address field 244 that may carry either one of the Transmitter Address, Receiver address or both. Other control information may be carried in the TD Control field 246 depending on the frame Type. For example in WUR beacon frames, the TD Control field 246 may carry a timestamp field, while in unicast WUR frames, the TD Control field 246 may carry a packet number, etc.

Figure 3:
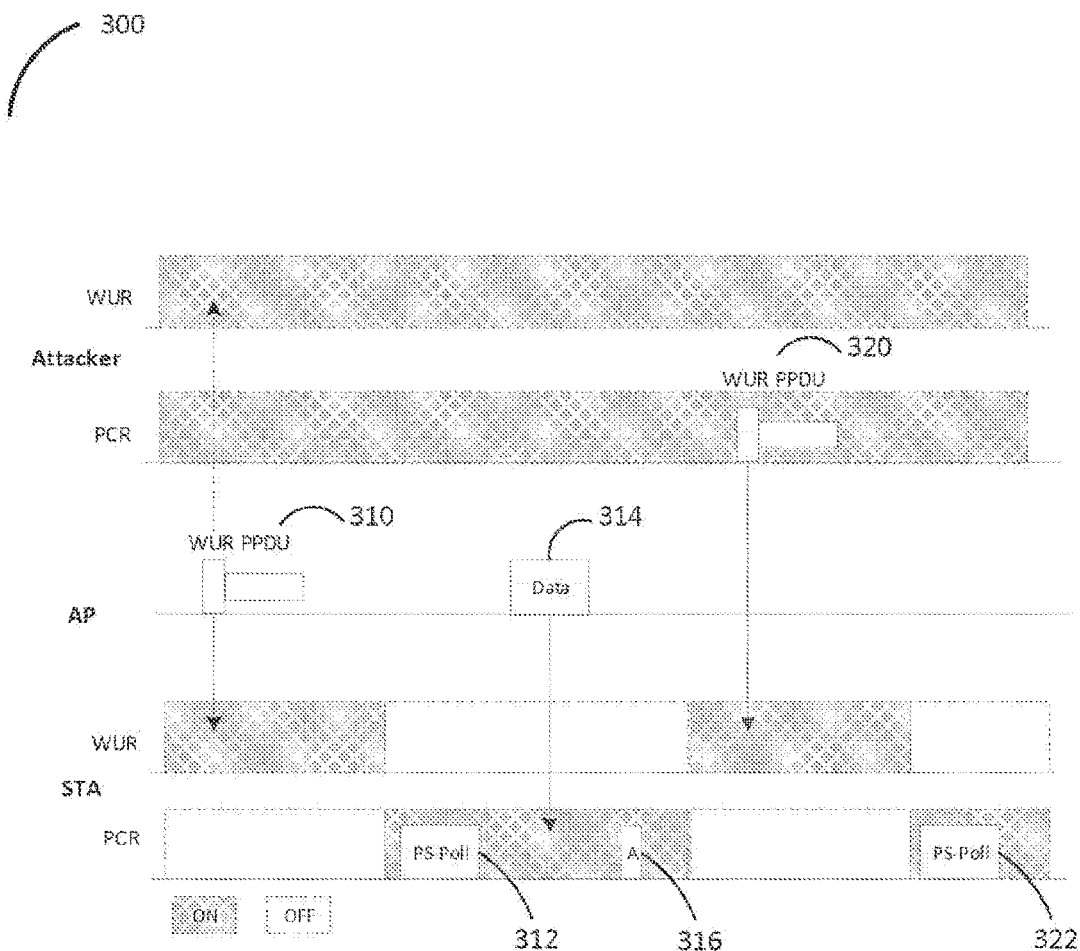
FIG. 3 depicts a frame transmission sequence that illustrates an example of a malicious attack.

FIG. 3 depicts a frame transmission sequence 300 that illustrates an example replay attack launched by an attacker in the wireless network 100 in FIG. 1. The attacker may be the STA 120 in FIG. 1, while the AP and the STA may be the AP 110 and STA 130 in FIG. 1 respectively. STA 130 may have undergone WUR mode negotiation with AP 110 and may be operating in WUR mode with only its WURx 134 in operation while its PCR 132 is turned off. The attacker STA 120 on the other hand has both its WURx 124 as well as PCR 122 turned on and may be monitoring the traffic between AP 110 and STA 130. When the AP 110 gets data from the upper layer protocol destined for STA 130, it saves the data frame in buffer and transmits a WUR PPDU 310 to wake STA 130. Upon receiving the WUR PPDU 310, STA 130 verifies that the PPDU is addressed to it and proceeds to turn on its PCR 132 and transmit a PS-Poll frame 312 to the AP 110. In the meanwhile, the WURx 124 of attacker 120 also receives the WUR PPDU 310 and saves it in memory for future use. The AP 110 responds to the PS-Poll frame 312 by transmitting the buffered data frame 314 to STA 130. STA 130 confirms the receipt of the data frame 314 by sending the acknowledgement (ACK) frame 316 to the AP 110 and may proceed to WUR mode by turning off its PCR radio 132. At a later point in time, the attacker STA 120 may use the captured WUR PPDU 310 to launch a replay attack on STA 130 by retransmitting the WUR PPDU 310 to it, causing it to transition to PCR mode. Since the WUR PPDU 320 is a replay of a valid WUR PPDU transmitted by AP 110 in the past, it appears to be a valid WUR PPDU to STA 130 and it may proceed to transmit another PS-Poll frame 322 and may wait for AP 110 to send data frame to it. Eventually, when STA 130 does not receive any frames from the AP, it may time out of the PCR mode and goes back to WUR mode, however it would already have lost some power unnecessarily transitioning to PCR mode. If no measures are implemented to mitigate such attacks, the attacker STA 120 may repeat the replay attack until STA 130 completely runs out of battery.

Several exemplary embodiments are described in detail in later sections to describe the disclosure in detail. The various embodiments for mitigating malicious false wake up attacks as per the present disclosure are described in detail in the following sections.

First Embodiment

Figure 4:
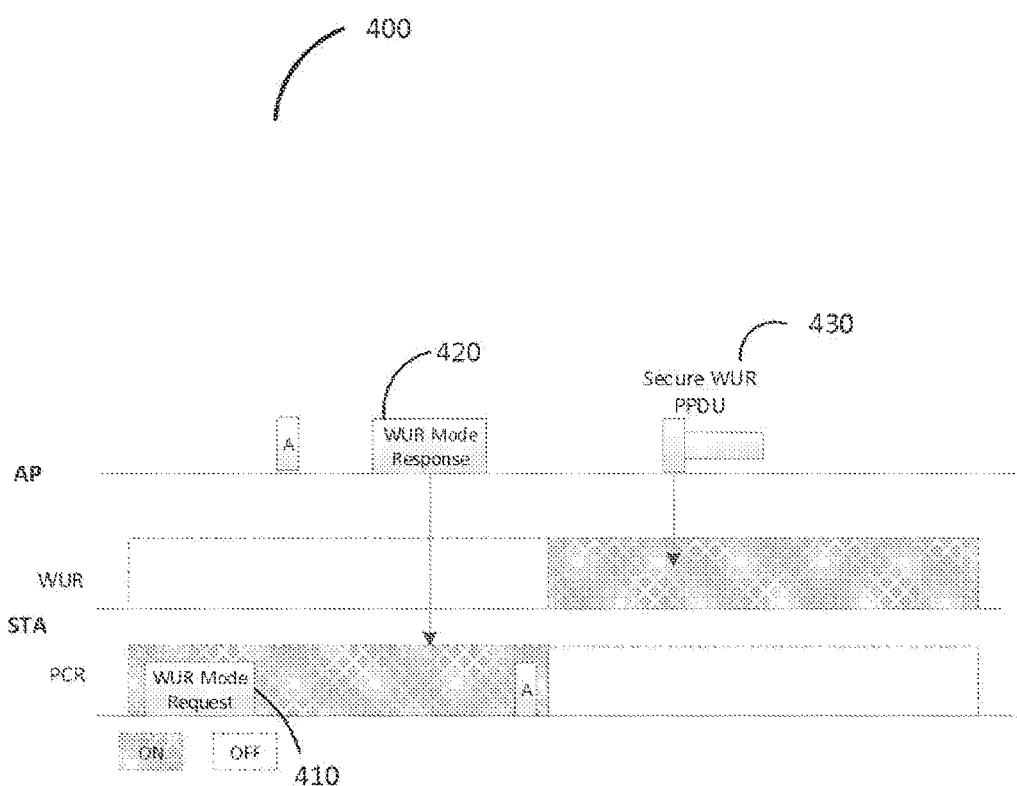
FIG. 4 depicts a frame transmission sequence used to negotiate/initiate WUR mode as per the first embodiment.

FIG. 4 depicts the frame exchange sequence 400 used by a WUR STA to negotiate the parameters used during WUR mode with its AP. The frame exchange 400 needs to be completed before a WUR STA enters the WUR mode for the first time. It may also be used subsequently to change parameters related to WUR mode and also to enter or exit the WUR mode. WUR Action frame 500 in FIG. 5 may be used for the WUR mode negotiations. A WUR STA initiates the WUR mode negotiation by transmitting a WUR Mode Request frame 410, which may be a variant of the WUR Action frame 500 with the WUR Mode Request/Response field 512 in the WUR Mode element 510 set to WUR Mode Request. Alternatively, the WUR Mode Request indication may also be carried within the WUR Action field 502. In either case, a WUR Mode Request frame refers to a WUR Action frame that carries an indication for WUR Mode request. Although not shown in FIG. 5, the WUR mode element may also carry other parameters related to WUR mode operation such as duty cycle parameters, etc. As per the first embodiment, the WUR mode element also contains a Security field 514 that may be set to 1 by a WUR STA to request the AP to enable secure transmission mode for future transmissions of WUR PPDUs. Secure WUR transmission may be requested by WUR STAs right from the beginning or it may only be requested when a WUR STA detects that it is under attack. Although it may not be possible for a WUR STA to detect an attack just from one or two false wake ups, if the STA keeps getting woken up without receiving any follow up downlink frames from the AP for more than a certain threshold value, for example 5 times, the STA may consider itself under attack and request for security to be enabled. Upon receiving the WUR Mode request frame 410, the AP responds with the WUR mode response frame 420, which is another variant of the WUR Action frame 500 in FIG. 5 with the WUR Mode Request/Response field 512 in the WUR Mode element 510 set to WUR Mode Response. Alternatively, the WUR mode response indication may also be carried within the WUR Action field 502. In either case, a WUR Mode Response frame refers to a WUR Action frame that carries an indication for WUR Mode response. Aside from the parameters necessary for the WUR STA's WUR mode operation, if the WUR STA had requested security to be enabled for WUR transmissions, the AP also includes the WUR Security element 520 in FIG. 5 in the WUR mode response frame 420 carrying the parameters required for secure WUR communication. Once the security parameters have been notified, the AP will use the secure WUR PPDU 430 when it needs to wake the WUR STA.

Figure 5:
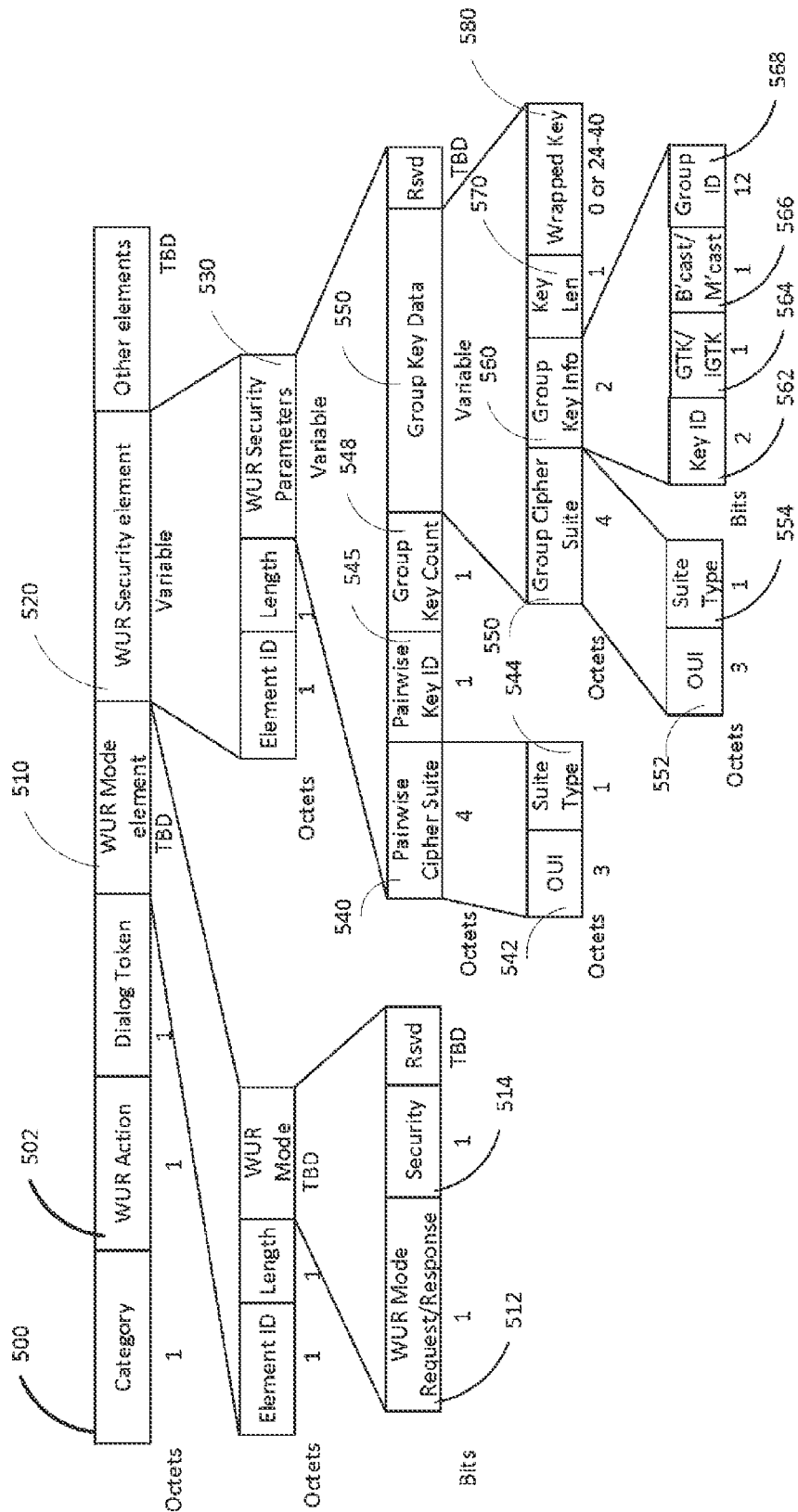
FIG. 5 shows the format of the WUR Action frame used for WUR mode negotiation/initiation as per the first embodiment.

The WUR security element 520 in FIG. 5 carries the WUR Security Parameters 530 that contains the information regarding the secret keys to be used by a WUR STA to receive secure WUR PPDUs. Since a WUR STA is also an IEEE 802.11 device, it makes sense that the STA reuses the existing 802.11 security framework as much as possible. Robust security network association (RSNA) is the default security protocol used by IEEE 802.11 devices. Although within RSNA there are several security algorithms such as counter mode with cipher-block chaining message authentication code protocol (CCMP), Galois/counter mode (GCM) protocol (GCMP), broadcast/multicast integrity protocol (BIP), etc., as well as several hash algorithms, the secret Keys that these algorithms use may be broadly classified as either Pairwise Key or Group Key. Pairwise Keys are used for unicast communication between a pair of devices, while Group Keys are used for broadcast or multicast communication. The Pairwise Cipher Suite field 540 indicates the Cipher suite to be used for unicast WUR PPDUs and is identified by the organizationally unique identifier (OUI) field 542 and the Suite Type field 544. The pairwise Key ID field 545 indicates the identifier of the Pairwise Key to be used for WUR PPDUs if more than one Pairwise Key has been negotiated between the AP and the WUR STA. The Group Key count 548 indicates the number of Group Keys included in the element. If the same Group Key is to be used for all WUR broadcast and multicast PPDUs, only one Group Key is required, however if the AP decides to use different Group Keys for broadcast and multicast WUR PPDUs, two or more Group Keys may be included in the element. The Group Key Data field 550, is variable in length, and includes the information regarding the Group Keys. For each included Group Key, the Group Cipher Suite field 550 indicates the Cipher suite to be used for broadcast or multicast WUR PPDUs and is identified by the organizationally unique identifier (OUI) field 552 and the Suite Type field 554. The Group Key Info field 560 identifies a Group Key as well as its use. The Key ID field 562 indicates the identifier of the Group key to be used for WUR PPDUs if more than one Key has been negotiated between the AP and the WUR STA; the GTK/IGTK field 564 indicates whether the Group Key is Group Temporal Key (GTK) or Integrity Group Temporal Key (IGTK) and the B'cast/M'cast field 566 indicates whether the Group Key is to be used for broadcast or multicast WUR PPDUs. The Group ID field 568 may be used to specify a particular multicast group with which the Group Key is associated and this field is set only if the B'cast/M'cast field 566 is set as multicast. The Key Len field 570 indicates the length of the Wrapped Key field 580 and may be set to 0 if the Wrapped Key field 580 is not included in the element. When the Key ID field indicates that the Group Key to be used for WUR PPDUs is the same as that negotiated for use in PCR, the Wrapped Key field 580 is omitted, else the Wrapped Key field 580 contains the encrypted GTK or IGTK Key to be used for WUR PPDUs.

Figure 6:
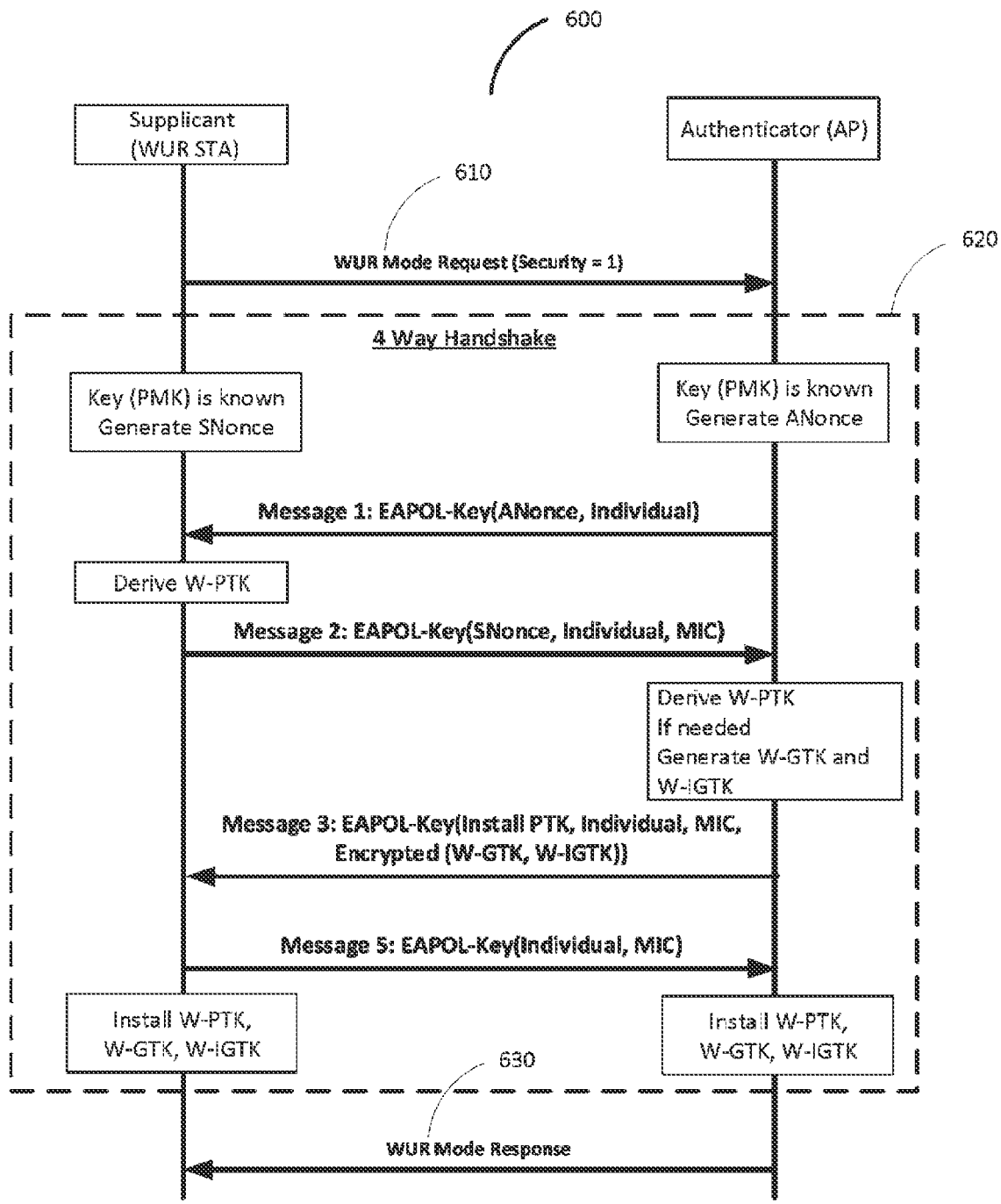
FIG. 6 depicts the 4-way handshake used to obtain the secret keys to be used in secure transmissions.

FIG. 6 depicts the WUR mode negotiation process 600 in which the AP and WUR STA negotiates separate secret Keys to be used exclusively for WUR PPDUs. Even though it would be possible to reuse the same secret Keys for WUR PPDUs as the ones used for PCR communications, if the WUR STA has the capability, the AP may also initiate a separate 4 way handshake process 620 with the WUR STA to obtain the PTK and GTK/IGTK to be used exclusively for WUR PPDUs. Since the PCR mode of operation and the WUR mode of operation are very distinct from each other and a STA may only operate in either one mode at a time, generating separate secret keys to be used exclusively for WUR PPDUs may be beneficial as the security risks are isolated to each mode of operation and the risk of a cryptographic salt being repeated for a secret key is minimized. In addition, renegotiation of the Group Keys used for PCR need not affect the Group Keys used for WUR PPDUs. Upon receiving the WUR Mode Request frame 410 from a STA requesting security to be enabled for WUR PPDUs in a WUR Mode Request procedure 610, the AP may choose to initiate the 4 way handshake 620 to derive separate secrets Keys used to encode/decode WUR PPDUs. The 4 way handshake 620, shown within the dotted box, is the same as used in RSNA when a STA associates with the AP to negotiate the Pairwise Transient Key (PTK) and Group Keys (GTK and IGTK) to be used for secure sessions except that the secret Keys are meant to be used exclusively for WUR PPDUs and hence the secret Keys may be referred to as W-PTK, W-GTK and W-IGTK to differentiate them from the secret Keys used during PCR communications. The AP concludes the WUR mode negotiation by transmitting the WUR Mode Response frame 420 which carries the rest of the parameters necessary for the WUR STA to enter WUR mode in a WUR Mode Response procedure 630. In this case the WUR Mode Response frame 420 does not include the Wrapped Key field 580 shown in FIG. 5. However the AP may choose to transmit unsolicited WUR Mode Response frame 500 in FIG. 5 that includes the Wrapped Key field 580 to the WUR STA at a future time to update the Group Keys in the event that the Group Keys may have changed while the WUR STA was in WUR mode.

Figures 7, 8:
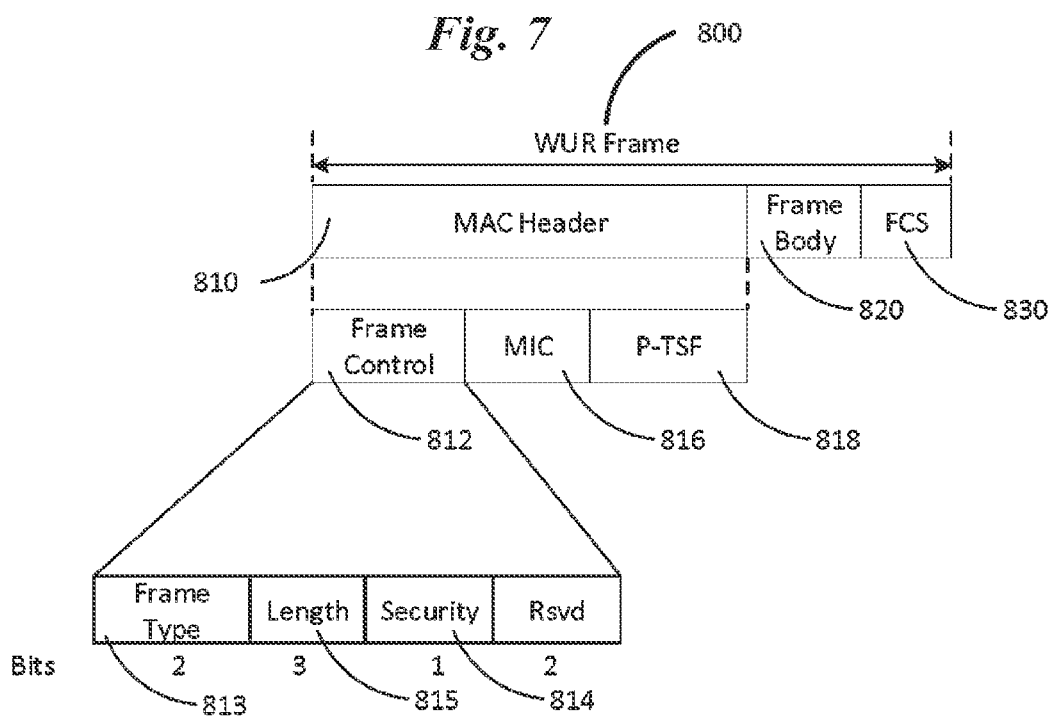
FIG. 7 is a table of the encoding of the Cipher suite field in WUR security element as per the first embodiment.
FIG. 8 shows the frame format proposed for secure WUR frames as per the first embodiment.

FIG. 7 is the table 700 of the OUI and Suite Type encoding used in the WUR Security element and is used to identify the security algorithm used for secure WUR PPDUs. The AP may choose the appropriate algorithm to use based on factors such as STA's capabilities. For example, for very resource limited WUR STAs, AP may choose simple hash functions such as SHA1-128 or SHA-256, while for WUR STAs with higher processing power, the AP may choose the CCMP-128 Cipher suite. If the AP indicates "Use group cipher suite" for pairwise cipher suite, PTK is not used for WUR PPDUs and only Group Keys are used. Although the use of pairwise cipher suite is recommended for unicast WUR PPDUs, under certain circumstance the AP may also decide to use Group cipher suite for all WUR PPDUs.

FIG. 8 illustrates a secure WUR frame 800 that carries a cryptographically encoded MIC field 816 which helps the intended receiver WUR STA to categorically authenticate the transmitter of the frame. In order to differentiate secure WUR frames from unsecure WUR frames, the AP sets the Security bit 814 within the Frame Control field 812 to 1. The Security bit 814 alerts the receiving WUR STA of the presence of the MIC field 816 within the WUR frame. As mentioned earlier, due to the comparatively simple signals used for transmissions of WUR PPDUs, it is not very difficult for an attacker to replay an earlier WUR PPDU, or even generate a forged WUR frame with the malicious intention of causing a WUR STA to waste battery power by forcing the STA to wake up unnecessarily. Such attempts may be thwarted if the WUR frame contains some field that can only be generated by a trusted transmitter using a shared secret Key and which can be verified by the intended WUR STA using the same secret Key. Such fields are generally known as Message Authentication Codes (MAC) or Message Integrity Codes (MIC). The AP may use popular cryptographic hash functions that are also commonly used in IEEE 802.11 devices such as SHA-1-128, SHA-256, SHA-384 or MD5, etc., to generate the MIC field 816, or the AP may also choose to generate the MIC field 816 using block cipher algorithm such as Cipher Block Chaining Message Authentication Codes (CBC-MAC) which in turn may be based on Advanced Encryption Standard (AES) such as AES-128-CMAC or AES-256-CMAC. The AP's choice of the cryptographic algorithm to use to generate the MIC field 816 may be based on factors such as STA's capabilities, for example for very resource limited WUR STAs, AP may choose simple hash functions such as SHA1-128 or SHA-256, while for WUR STAs with higher processing power, the AP may choose the CCMP-128 which is based on AES. A key assumption in using MAC or MIC to provide security is the fact that an attacker that does not possess the secret Key is not able to generate the same MIC or it is too computationally expensive to reverse engineer the secret key based on the MIC. However, it is still possible for an attacker to sniff a genuine secure WUR PPDU and use it at a future time to launch a replay attack. To prevent such replay attacks, the transmitter must ensure that each MIC computation uses a unique input (or a random number) that is different for each secure WUR PPDU for a particular secret Key. Such unique inputs are generally known as "salt" or "nonce."

Several types of WUR frames are being considered in the IEEE 802.11ba Taskgroup and even though the format of the frames may be similar, as shown in the generic WUR frame 230 in FIG. 2, the content of the frame fields may differ slightly depending on frame type. WUR frames that are addressed to a single WUR STA may be known as unicast WUR frame, WUR frames that are addressed to a group of WUR STAs may be known as multicast WUR frames while WUR frames that are addressed to all the WUR STAs associated with an AP may be known as broadcast WUR frames. A unicast WUR frame may contain both the Receiver Address (RA) as well as Transmitter Address (TA) within the Address field 244, and the TD control field 246 may contain a timestamp field or a packet number, while the Frame body 250 field may be absent. Similarly a broadcast WUR frame such as WUR Beacon, that is purely used for time synchronization (i.e., not used to wake WUR STAs) may only contain a Transmitter Address (TA) within the Address field 244, and the TD control field 246 may contain a timestamp field use for time synchronization and the Frame body 250 may be absent. A multicast WUR frame on the other hand may contain the Transmitter Address in the Address field 244, a timestamp or packet number in the TD control field, while the Frame body field 250 may contain a list of the WUR STAs that are targeted for waking by the multicast frame.

Referring again to FIG. 8, if a WUR frame contains a unique number that is different for each WUR frame, for example a Partial-TSF (P-TSF) field 818, this may be used as a salt for the cryptographic function. The P-TSF field may represent some selected bits of the Time Synchronization Function (TSF) maintained by the AP. If the WUR frame is a unicast frame, the AP uses its secret Key, for example the Temporal Key (TK) portion of the pairwise secret Key PTK or W-PTK, the Transmitter Address (TA) and the Receiver Address (RA), as well as the P-TSF field as input to the cryptographic algorithm to obtain a MIC. Usually, the output of a standard cryptographic function may be too long to directly use in WUR PPDUs and may need to be truncated to fit the limited size of the WUR frames. For example, if the AP uses SHA-256 to generate the MIC, the cryptographic process at the AP may be summarized as:

$$MIC=\text{Truncate-}L(\text{SHA-256}(TK\|TA\|RA\|P\text{-TSF}))$$

TK=Temporal Key (TK) portion of the pairwise secret Key PTK or W-PTK and its length depends on the Cipher suite selected during the 4 way handshake, for example 128 bits for CCMP-128, etc.
TA=Transmitter Address (MAC address of the AP=the Basic Service Set Identifier (BSSID) of the BSS)
RA=Receiver Address or the WUR ID (WID) assigned to the destination STA (e.g., AID12 of the recipient WUR STA)
Truncate-L=function to truncate the output of the SHA-256 function (128 bits) to L bits.
L=number of bits of the Address field 244
x∥y=concatenation of x and y Alternatively, if the AP used the AES-128-CMAC to generate the MIC, the TK, TA, RA and P-TSF are fed into the AES engine as inputs which will return a 128 bit number as the MIC which is then truncated to L bits.

Finally, the AP replaces the Address field 244 in FIG. 2 with the MIC field 816, sets the security bit 814 to 1 and computes the FCS 830 over the entire WUR frame 800 and transmits the secure WUR PPDU carrying the WUR frame 800.

As for a receiving WUR STA that receives the WUR frame 800, it first verifies that the frame is error free by checking the FCS field 830. The Security bit 814 alerts the STA that the WUR frame 800 is a secure frame and its Address field is replaced by the MIC field 816 while the Frame Type field 813 indicates that the frame is a unicast WUR frame. The STA uses its secret Key, for example the Temporal Key (TK') portion of the pairwise secret Key PTK or W-PTK, the BSSID of its BSS as the Transmitter Address (TA') and the WUR ID (WID) assigned to the STA (e.g., STA's AID12) as the Receiver Address (RA'), as well as the P-TSF field 818 as input to the cryptographic algorithm to obtain a MIC. For example, if the AP had indicated in the WUR mode response frame that SHA-256 is to be used as the Cipher suite to use for pairwise communication, the cryptographic process at the STA may be summarized as:

$$MIC'=\text{Truncate-}L(\text{SHA-256}(TK'\|TA'\|RA'\|P\text{-TSF}))$$

Since both the TA and RA were used as input to the MIC calculation, if the computed MIC' matches the MIC field 816, the WUR STA implicitly identifies itself as being the receiver of the WUR frame and also concludes that the frame is an authentic frame transmitted by its AP. In order to further protect itself from replay attacks, the WUR STA may perform additional checks based on the P-TSF field, for example, the STA may check that the P-TSF value is greater than that of WUR frames received in the past and also that the difference between the P-TSF value in the received WUR frame and the locally maintained P-TSF is within a certain acceptable value from its local P-TSF value, for example less than the maximum expected clock drift. If the P-TSF check fails, the WUR STA discards the frame, otherwise the STA proceeds to take the expected action based on the content of the WUR frame, for example waking up its PCR if the WUR frame 800 is a unicast WUR frame. In order to prevent the case where the number of bits allocated to the P-TSF field is low and the P-TSF value may roll over after hitting the maximum and thereby causing genuine WUR frames being falsely classified as replayed WUR frames, the AP has to ensure that the secret key is changed every time the P-TSF value rolls over. As for third party WUR STAs, if any of the inputs to the cryptographic function, for example the secret Key or the RA is different, the MIC' computation will not match the MIC field carried in the WUR frame and the WUR STA can safely discard such frames.

The example above assumed the presence of both the TA and RA in the Address field 244 of the WUR frames. However, if the WUR frame to be secured only carries the TA, for example WUR Beacon frames, the MIC is calculated using the Temporal Key (TK) portion of the Group Key GTK or W-GTK, the BSSID of its BSS as the Transmitter Address (TA) as well as the P-TSF field as input to the cryptographic algorithm.

$$MIC=\text{Truncate-}L(\text{SHA-256}(TK\|TA\|P\text{-TSF}))$$

Any WUR STA that possesses the same Group Key would be able to verify the MIC and will be able to correctly receive the broadcast WUR Beacon and synchronize its local P-TSF based on the P-TSF field of the received frame.

Figure 9A:
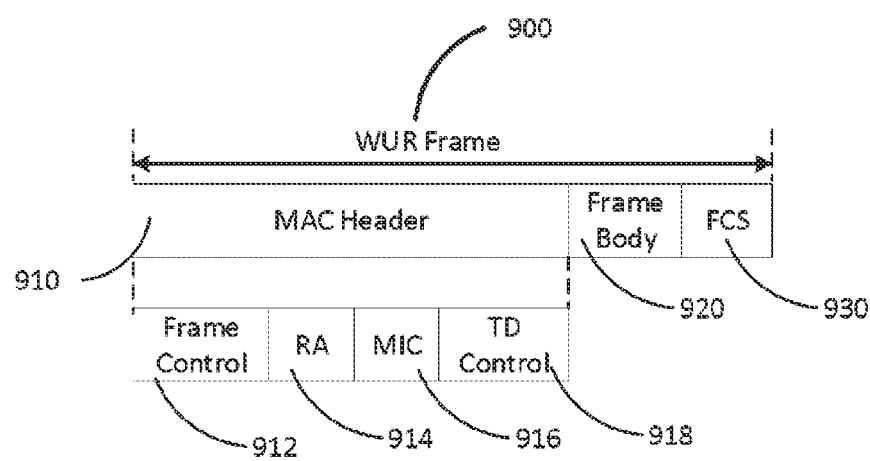
FIG. 9A shows an alternative frame format proposed for secure WUR frames as per the first embodiment.
Figure 9B:
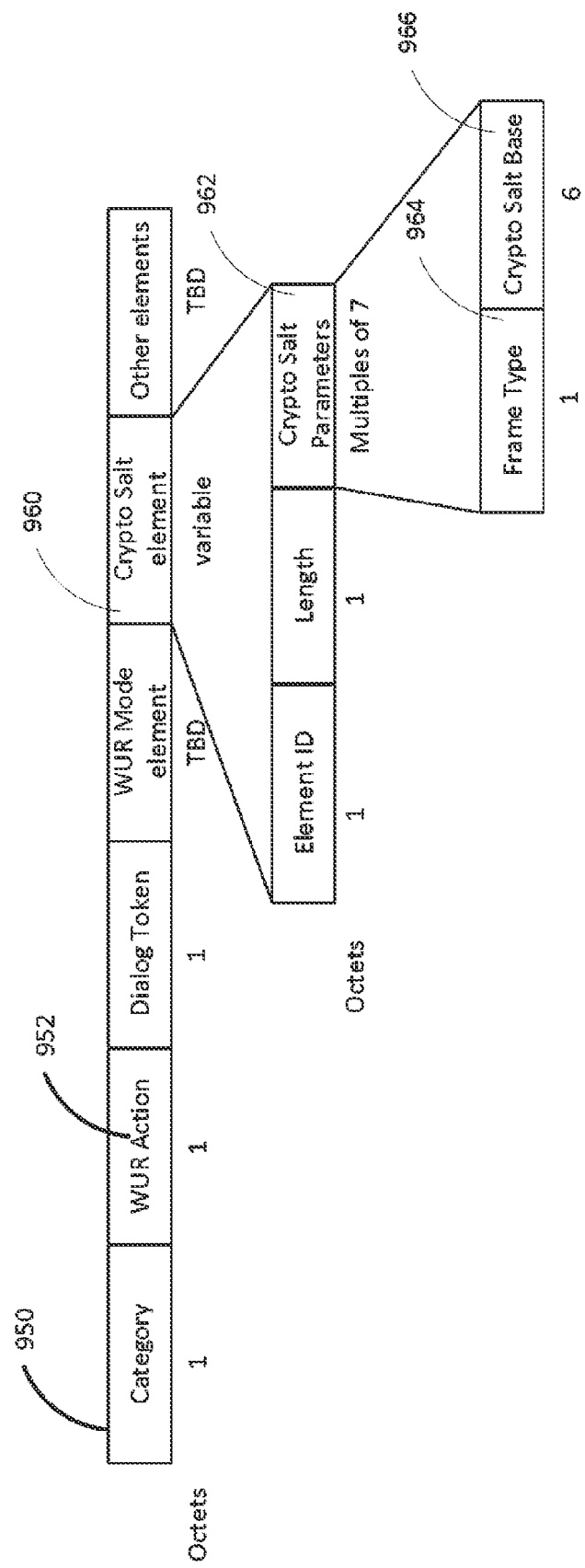
FIG. 9B shows the format of the WUR Action frame used for notifying the cryptographic salt value as per the first embodiment.

Referring to FIG. 9A, a WUR frame 900 is shown that does not carry a unique number that may be used as salt for the cryptographic computation. Even if such frames included a MIC field, the receiver would still be vulnerable to replay attack if the cryptographic computation did not include any unique salt value known to both the transmitter and the recipient. Without a salt value, the cryptographic computation will output the same MIC for a given WUR frame if the content of the frame remains the same. In order to overcome such situation, during the WUR mode negotiation, for each WUR STA that negotiates secure WUR mode with an AP, the AP may provide a base random number to use as the base number to generate the cryptographic salt for WUR frame types that do not carry a unique number that may be used as salt for the cryptographic computation. The WUR Action frame 950 in FIG. 9B may be used for the purpose by the AP. In this variant of the WUR Action frame, the indication of whether the Action frame is a request frame from WUR STAs or a response frame from the AP may be carried within the WUR Action field. When the WUR Action frame is used to carry the cryptographic salt, the WUR Action field is set as WUR Mode response. Although not shown, the WUR Security element 520 may also be present. In addition, the AP also includes the Crypto Salt element 960 to provide the base number to use for the cryptographic salt. Since it is possible that more than one WUR frame types may require separate cryptographic salts, the AP may include one or more Crypto Salt Parameters field 962 within the Crypto Salt element 960. Each Crypto Salt Parameters field 962 is comprised of a Frame Type field 964 that specifies the WUR frame type to which this cryptographic salt is to be applied and the Crypto Salt Base field 966 that specifies the starting number to use as the salt for the indicated WUR frame type. The encoding of the WUR Frame Type field 964 is the same as the Frame Type field 813 in FIG. 8. For unicast or multicast WUR frame types that require such cryptographic salt, the AP maintains one unique number per frame type per WUR STA or per multicast Group that has negotiated secure WUR transmission. Each WUR STA that has negotiated secure WUR transmission also maintains one unique number per frame type for unicast as well as one unique number per frame type for each multicast group that it belongs to. By default, the Crypto Salt Base may be set to zero during initialization or the AP may also choose a different random value as the starting number. After each successful transmission of a secure WUR frame, the AP increments the value of the cryptographic salt associated with that WUR frame by one. Similarly, a WUR STA that successfully receives such secure WUR frame also increments the value of the cryptographic salt associated with that WUR frame by one. If $r\_STA$ represents the current value of the cryptographic salt maintained by the AP for a particular frame type for a WUR STA, the AP uses its secret Key, for example the Temporal Key (TK) portion of the pairwise secret Key PTK or W-PTK, the BSSID and the Receiver Address (RA), as well as the $r\_STA$ as input to the cryptographic algorithm to obtain a MIC. For example, if the AP uses SHA-384 to generate the MIC, the cryptographic process at the AP may be summarized as:

$$MIC = \text{Truncate-}L(\text{SHA-384}(TK\|BSSID\|RA\|r\_STA))$$

L=number of bits of the Address field 244 less the number of bits of the RA field 914

The AP replaces the TA portion of the Address field 244 in FIG. 2 with the MIC field 916, sets the security bit in the Frame Control 912 to 1 and computes the FCS 930 over the entire WUR frame 900 and transmits the secure WUR frame 900.

At a receiving WUR STA, it first compares the RA field 914 with its own WUR ID and if there is a match, it proceeds to compare the MIC field 916. If $r\_STA'$ represents the current value of the cryptographic salt maintained by the STA for the particular frame type, it uses its secret Key, for example the Temporal Key (TK') portion of the pairwise secret Key PTK or W-PTK, the BSSID of its BSS and the WUR ID (WID) assigned to the STA (e.g., STA's AID12) as the Receiver Address (RA'), as well as $r\_STA'$ as input to the cryptographic algorithm to obtain a MIC'. For example, if the AP had indicated in the WUR Mode Response frame that SHA-384 is to be used as the Cipher suite to use for pairwise communication, the cryptographic process at the STA may be summarized as:

$$MIC' = \text{Truncate-}L(\text{SHA-384}(TK'\|BSSID'\|RA'\|r\_STA'))$$

If the computed MIC' matches the MIC field 916, the WUR STA implicitly identifies itself as being the receiver of the WUR frame and also concludes that the frame is an authentic frame transmitted by its AP. At the same time, the STA increments the cryptographic salt maintained by the STA for the particular frame type by one and proceeds to wake its PCR. Upon receiving a response frame from the WUR STA, the AP also increments the cryptographic salt maintained by the AP for the particular frame type for the WUR STA by one. In this case, since the cryptographic salt value is always incremented by both the AT and STA following each successful WUR transmission, any replayed WUR PPDU will fail to pass the MIC check and hence the replay attack is thwarted.

In order to recover from the case where the AP and STA may lose synchronization and have different values of the cryptographic salt, few options could be employed:

1. AP can save the past one or more values of $r\_STA$. In the event that the STA does not wake up for repeated transmission of WUR frame using a particular value of $r\_STA$, AP can re-use the saved value of past $r\_STA$ to generate the MIC to be transmitted in the WUR frame.
2. In addition to the Crypto Salt Base, AP provides another unique random number $e\_STA$ to each WUR STA for emergency/backup use. STA saves $e\_STA$ to memory. The AP uses the $e\_STA$ as the cryptographic salt to generate the MIC in case the STA does not respond to repeated WUR frames carrying the MIC based on $r\_STA$. Upon receiving a WUR frame, STA compares the MIC in the WUR frame with the MIC generated using both $r\_STA$ and $e\_STA$. If either value matches, the WUR frame is considered authentic. Once a particular $e\_STA$ has been used, a new $e\_STA$ is negotiated between AP and the STA.

As a slight variation, the MIC' value may also be pre-computed by the WUR STA using the latest value of the cryptographic salt while the STA is in the PCR mode and saved to a common memory accessible to both PCR and WUR. When the STA receives a secure WUR frame, it simply compares the MIC field in the received frame with the saved MIC' in the memory to determine the authenticity of the received WUR frame. This option may be preferable when a more computationally intensive cipher suite is selected by the AP since a WUR STA may have access to a more powerful CPU during the PCR mode as compared to the WUR mode, thereby leading to some power savings.

As mentioned earlier, due to the relatively low data rates expected to be available for transmissions of WUR PPDU, it is beneficial to keep the length of the WUR frame as short as possible. Replacing either the TA field or both the TA and RA fields with the MIC has an added advantage of minimizing the increase in the length of the secure WUR frames. In addition, since the length of the input fields for the cryptographic computation is not a big concern, instead of using the abbreviated address fields such as 12 bits of AID12 for RA, or 12 bits of BSS color (network identifier) as TA, the 48 bits long full MAC addresses may be used as RA and TA for the MIC computation. This further reduces the chances of unintended false positives for the MIC, for example due to a neighboring OBSS using the same BSS color. As an example, assuming the address field 244 in FIG. 2 is 16 bits long, if the addressed field is replaced by the MIC field 816 as shown in FIG. 8, the length of the secure WUR frame remains the same as unsecure WUR frame.

Second Embodiment

Figure 10A:
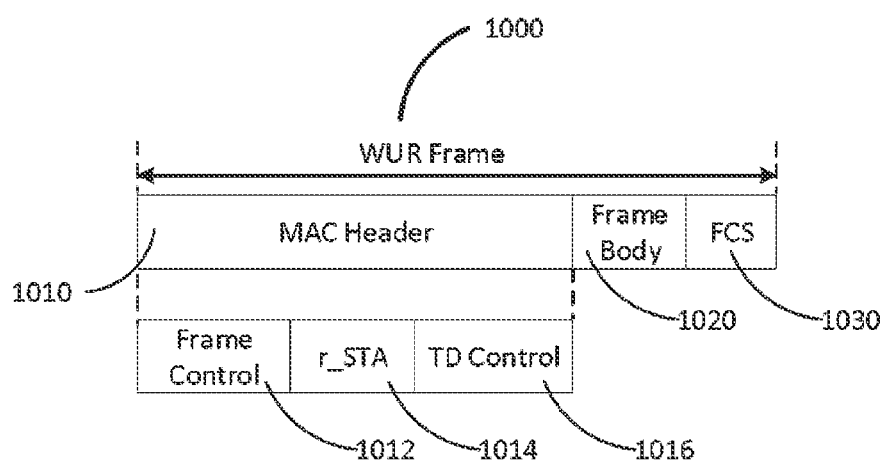
FIG. 10A shows the frame format proposed for secure WUR frames as per the second embodiment.

Referring to FIG. 10A, an alternate solution is presented for WUR frames that do not carry a unique number that may be used as salt for the cryptographic computation. During the WUR mode negotiation, for each WUR STA that negotiates secure WUR mode with an AP, for each unicast or multicast WUR frame types that require such cryptographic salt, the AP maintains one unique number per frame type per WUR STA or per multicast Group as a base number to generate the cryptographic salt for the frame type. By default, the base number may be set to zero during initialization or the AP may also choose a different random value as the starting number. Using the current value of the base number as the cryptographic salt, the AP computes a MIC for each WUR STA before the STA goes to WUR mode and transmit the MIC to the WUR STA using PCR. If r_STA represents the current value of the base number maintained by the AP for a particular frame type for a WUR STA, the AP uses its secret Key, for example the Temporal Key (TK) portion of the pairwise secret Key PTK or W-PTK, the BSSID and the Receiver Address (RA), as well as the r_STA as input to the cryptographic algorithm to obtain a MIC. For example, if the AP uses HMAC-MD5 to generate the MIC, the cryptographic process at the AP may be summarized as:

MIC=HMAC-MD5(TK||BSSID||RA||r_STA)

Figure 10B:
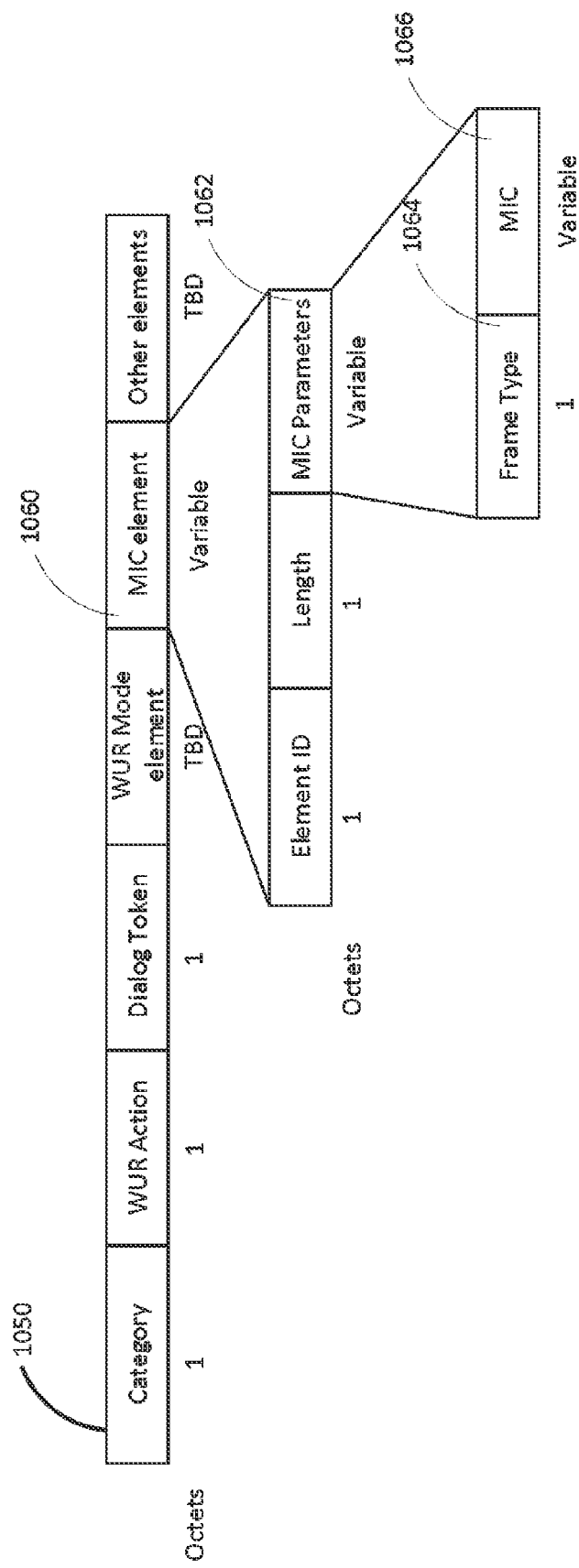
FIG. 10B shows the format of the WUR Action frame used for notifying the MIC as per the second embodiment.

The WUR Action frame 1050 in FIG. 10B with the mode indication set to WUR Mode Response may be used by the AP to transmit the MIC to a WUR STA. The AP may include one or more MIC Parameters field 1062 within the MIC element 1060. Each MIC Parameters field 1062 is comprised of a Frame Type field 1064 that specifies the frame type to which this MIC is to be applied and the MIC field 1066 that carries the MIC to be used to verify the indicated WUR frame type. The length of the MIC field 1066 depends on the Cipher suite used to compute the MIC. The encoding of the WUR Frame Type field 1064 is the same as the Frame Type field 813 in FIG. 8. Each WUR STA that has negotiated secure WUR transmission receives and saves one unique MIC per frame type for unicast as well as one unique MIC per frame type for each multicast group that it belongs to. Subsequently when the AP needs to transmit a secure WUR frame that require a separate cryptographic salt to a WUR STA that is in WUR mode, it transmits the WUR frame 1000 that replaces the Address field 244 in FIG. 2 with r_STA 1014, the current value of the base number maintained for the WUR STA. The number of bits used for the base number is as such limited by the number of bits allocated for the Address field 244 in FIG. 2.

At a receiving WUR STA, it uses its secret Key, for example the Temporal Key (TK') portion of the pairwise secret Key PTK or W-PTK, the BSSID of its BSS and the WUR ID (WID) assigned STA (e.g., STA's AID12) as the Receiver Address (RA'), as well as the r_STA received in the WUR frame 1000 as input to the cryptographic algorithm to obtain a MIC'. For example, if the AP had indicated during the initial WUR mode negotiation that HMAC-MD5 is to be used as the Cipher suite to use for pairwise communication, the cryptographic process at the STA may be summarized as:

MIC'=HMAC-MD5(TK'||BSSID'||RA'||r_STA))

If the computed MIC' matches the saved MIC for the frame type, the WUR STA implicitly identifies itself as being the receiver of the WUR frame and also concludes that the frame is an authentic frame transmitted by its AP. After each successful transmission of a secure WUR frame, the AP increments the value of the base number associated with that WUR frame by one, re-computes the MIC using the base number and provides the MIC to the WUR STA during a PCR session before the STA goes back to WUR mode. One advantage of using this method is that there is no need to truncate the MIC and the full length MIC is used to verify the authenticity of WUR frames, however there is an extra transmission of the MIC during each PCR session. This method may be suitable when the WUR frames are transmitted infrequently but a higher level of security is expected.

Third Embodiment

Figure 11A:
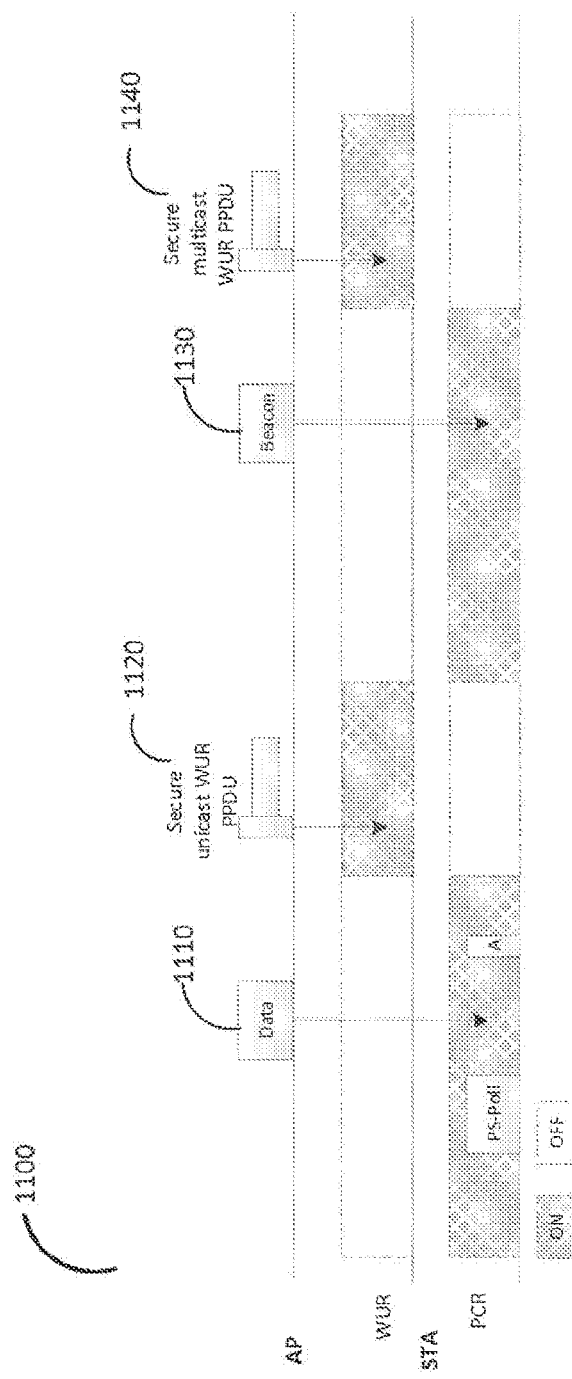
FIG. 11A depicts a first frame transmission sequence used in secure WUR transmissions as per the third embodiment.
Figure 11B:
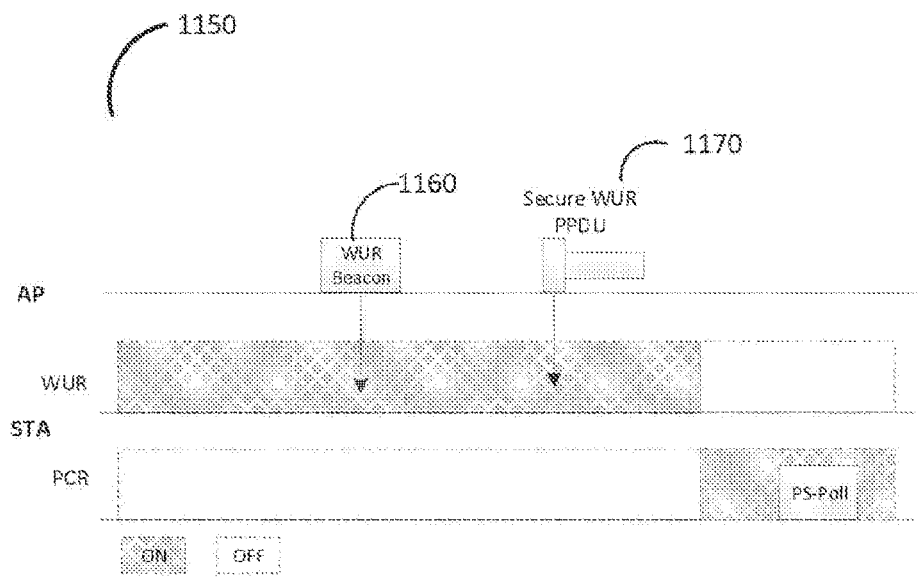
FIG. 11B depicts a second frame transmission sequence used in secure WUR transmissions as per the third embodiment.
Figure 12:
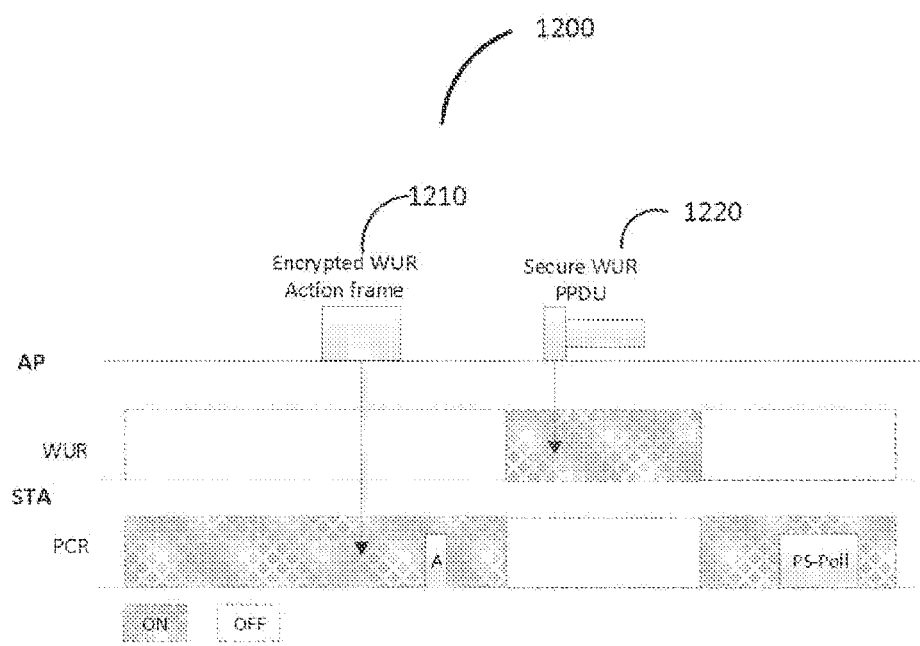
FIG. 12 depicts a frame transmission sequence used in secure WUR transmissions as per the fourth embodiment.
Figure 13:
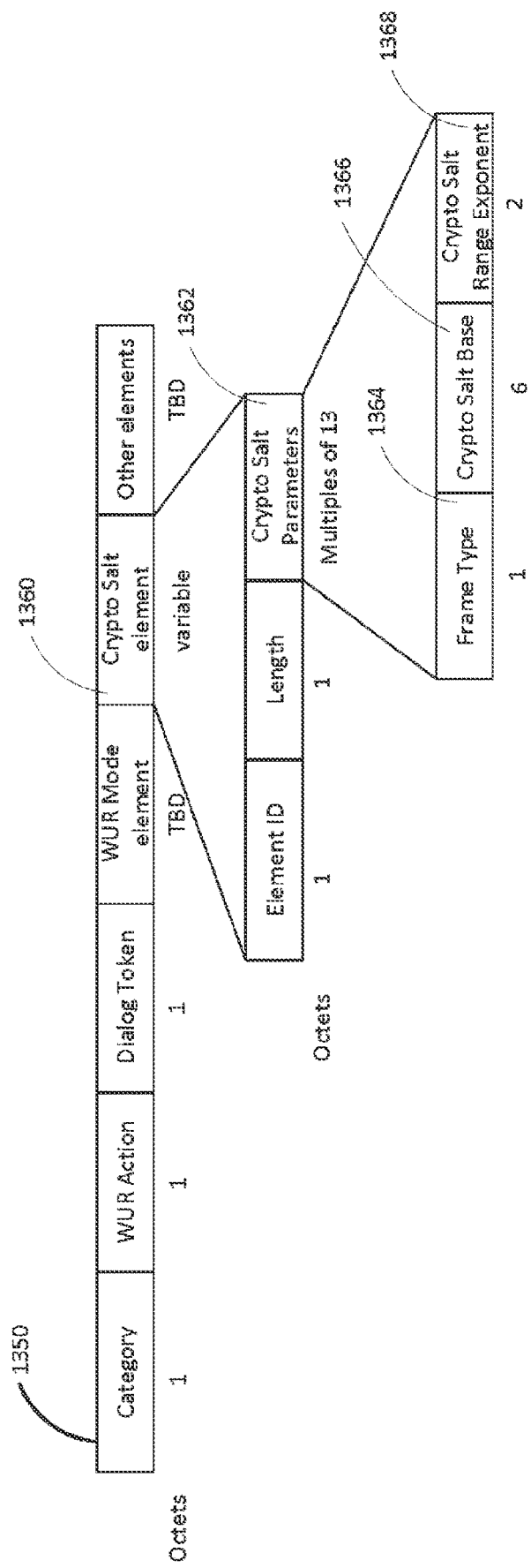
FIG. 13 shows the format of the WUR Action frame used for notifying a cryptographic salt range as per the fifth embodiment.

Referring to FIG. 11A, yet another alternate solution is presented for WUR frames that do not carry a unique number that may be used as salt for the cryptographic computation. Instead of explicitly providing a random number to use as a cryptographic salt, the WUR STAs may also implicitly receive the number to use as cryptographic salt from the frames exchanged during the PCR session. For unicast WUR frames, the Sequence Number carried within the Sequence Control field of the MAC header of the most recent unicast Data frame or unicast Management frame from the AP that was successfully received by the WUR STA may be used as the cryptographic salt. For example, if SN represents the current value of the Sequence Number of the most recently transmitted Data frame 1110, the AP uses its secret Key, for example the Temporal Key (TK) portion of the pairwise secret Key PTK or W-PTK, the BSSID and the Receiver Address (RA), as well as the SN as input to the cryptographic algorithm to obtain a MIC. For example, if the AP uses SHA-256 to generate the MIC, the cryptographic process at the AP may be summarized as:

MIC=Truncate-$L$(SHA-256(TK||BSSID||RA||SN))

$L$=number of bits of the Address field 244

The AP replaces the Address field of the unicast WUR PPDU 1120 with the generated MIC, sets the security bit to 1 and computes the FCS over the entire WUR frame carried within the WUR PPDU and transmits the secure unicast WUR PPDU 1120.

At a receiving WUR STA, it uses its secret Key, for example the Temporal Key (TK') portion of the pairwise secret Key PTK or W-PTK, the BSSID of its BSS and the WUR ID (WID) assigned to the STA (e.g., STA's AID12) as the Receiver Address (RA'), as well as the sequence number SN' of the most recently received Data frame 1110 as input to the cryptographic algorithm to obtain a MIC'. For example, if the AP had indicated during the initial WUR mode negotiation that SHA-256 is to be used as the Cipher suite to use for pairwise communication, the cryptographic process at the STA may be summarized as:

MIC'=Truncate-$L$(SHA-256(TK'||TA'||RA'||SN'))

If the computed MIC' matches MIC field of the WUR PPDU 1120, the WUR STA implicitly identifies itself as being the receiver of the WUR frame and also concludes that the frame is an authentic frame transmitted by its AP and proceeds to wake its PCR.

As for multicast WUR PPDUs, since more than one WUR STA is required to be able to authenticate the WUR PPDU, the implicit cryptographic salt must be the same for all the STAs that are the intended recipients of the multicast WUR PPDU. The Timestamp field carried within the most recent 802.11 Beacon frame may be used as the implicit cryptographic salt for multicast WUR PPDUs. For example, if TSF represents the current value of the Timestamp field of the most recently transmitted Beacon frame 1130, the AP uses its secret Group Key negotiated for the multicast group, for example the Temporal Key (TK) portion of the Group Key GTK, IGTK or W-GTK, the BSSID and Group ID (GID) of the recipient multicast group, as well as the TSF as input to the cryptographic algorithm to obtain a MIC. For example, if the AP uses AES-128-CMAC to generate the MIC, the cryptographic process at the AP may be summarized as:

$$MIC=\text{Truncate-}L(AES\text{-}128\text{-}CMAC(TK\|BSSID\|GID\|TSF))$$

Here, AES-128-CMAC (TK∥BSSID∥GID∥TSF) is used to represent the output of the AES-128-CMAC algorithm that takes TK, BSSID, GID and TSF as inputs.

The AP replaces the Address field of the multicast WUR PPDU 1140 with the generated MIC, sets the security bit to 1 and computes the FCS over the entire WUR frame carried within the WUR PPDU and transmits the secure multicast WUR PPDU 1140.

At a receiving WUR STA, every time it receives a Beacon frame from its AP, it saves the timestamp field carried in the most recently received Beacon frame 1130 in memory as TSF. Subsequently when the STA receives a secure WUR frame and if the Frame Type of the received WUR frame indicates multicast frame, and if the STA belongs to a multicast group, it uses its Group Key GTK, IGTK or W-GTK, the BSSID of its BSS and the Group ID (GID') of the multicast group that the STA belongs to as well as the saved timestamp TSF' as input to the cryptographic algorithm to obtain a MIC'. For example, if the AP had indicated during the initial WUR mode negotiation that AES-128-CMAC is to be used as the Cipher suite to use for pairwise communication, the cryptographic process at the STA may be summarized as:

$$MIC'=\text{Truncate-}L(AES\text{-}128\text{-}CMAC(TK'\|BSSID\|GID'\|TSF'))$$

If the computed MIC' matches the MIC field of the WUR PPDU 1140, the WUR STA implicitly identifies itself as being the receiver of the multicast WUR frame and also concludes that the frame is an authentic frame transmitted by its AP and proceeds to wake its PCR.

It may be possible that a WUR STA is operating in the WUR mode for a very long stretches of time and only needs to be woken up very infrequently. In such cases, it is possible that the WUR STA does not switch to PCR mode very often. However such WUR STAs would still be receiving WUR Beacon frames regularly in order to maintain time synchronization with the AP. For such WUR STAs, the AP may instead use the P-TSF carried within the most recent WUR Beacon frame that the WUR STA is known to have received as the cryptographic salt for the next secure WUR frame that is address to the STA. For example, an AP may be aware of the WUR Beacon frames that a WUR STA listens to, based on the information such as the WUR STA's duty cycle. An example is shown in the frame exchange sequence 1150. If the AP is aware that the WUR STA will listen to the WUR Beacon 1160, and if P-TSF represents the value of the P-TSF field of the WUR Beacon frame 1160, the AP saves the P-TSF value in memory. Subsequently when the AP needs to wake the STA, the AP uses its secret Key, for example the Temporal Key (TK) portion of the pairwise secret Key PTK or W-PTK, the BSSID and the Receiver Address (RA) of the recipient WUR STA, as well as the saved P-TSF as input to the cryptographic algorithm to obtain a MIC. For example, if the AP uses AES-256-CMAC to generate the MIC, the cryptographic process at the AP may be summarized as:

$$MIC=\text{Truncate-}L(AES\text{-}256\text{-}CMAC(TK\|BSSID\|RA\|P\text{-}TSF))$$

The AP replaces the Address field of the WUR PPDU 1170 with the generated MIC, sets the security bit to 1 and computes the FCS over the entire WUR frame carried within the WUR PPDU and transmits the secure multicast WUR PPDU 1170.

At a receiving WUR STA, every time it receives a WUR Beacon frame from its AP, for example the WUR Beacon 1160, it saves the P-TSF field carried in the WUR Beacon in memory as P-TSF'. Subsequently when the STA receives a secure WUR frame, it uses its secret Key, the BSSID of its BSS and its WID as RA as well as the saved P-TSF' as input to the cryptographic algorithm to obtain a MIC'. For example, if the AP had indicated during the initial WUR mode negotiation that AES-256-CMAC is to be used as the Cipher suite to use for pairwise communication, the cryptographic process at the STA may be summarized as:

$$MIC'=\text{Truncate-}L(AES\text{-}256\text{-}CMAC(TK'\|BSSID\|RA'\|P\text{-}TSF'))$$

If the computed MIC' matches MIC field of the secure WUR frame carried by the WUR PPDU 1170, the WUR STA implicitly identifies itself as being the receiver of the WUR frame and also concludes that the frame is an authentic frame transmitted by its AP and proceeds to wake its PCR.

If the WUR Beacon frames also carry a monotonically increasing WUR Beacon Number, instead of using P-TSF as the cryptographic salt, the WUR Beacon Number may also be used by the AP and WUR STAs as the cryptographic salt for the MIC computation.

In the event that some of the WUR STAs have very low duty cycle, or have duty cycles that do not coincide with other WUR STAs, it will be difficult to ensure that such WUR STAs have received the TSF or P-TSF of the most recent PCR Beacon frame or the most recent WUR Beacon frame respectively. In such cases, the AP and WUR STAs may keep track of the sequence number of the Target WUR Beacon Transmit Time (TWBTT) for each WUR STA. Since the WUR Beacon Interval, the periodic interval at which the AP transmits WUR Beacons, is known to all WUR STAs, even without receiving a WUR Beacon a WUR STA is still able to keep track of the sequence number of the most recent TWBTT. This sequence number may then be used as the cryptographic salt for the MIC computation.

Fourth Embodiment

Even though cryptographic functions such as HMAC or CMAC are widely used in wireless communication systems and are considered much simpler than many other cryptographic functions, in certain very resource constrained deployments, even a hash computation may take up significant resource for a WUR STA when it is operating in WUR mode. In such cases, the AP may have to relax the definition of secure WUR frame and rely on common knowledge of some secret information that is known to both the AP and the WUR STA to protect the WUR frames. As an example, during each PCR session, the AP provides a randomly generated secret number r_STA to the WUR STA within an encrypted WUR Action frame 1210 which may be similar to the frame 1050 in FIG. 10B except that the MIC element carries the random number r_STA instead of a MIC. The WUR STA saves the random number in memory as r_STA'. Subsequently, when the AP needs to wake the WUR STA, the AP replaces the Address field of the WUR PPDU 1220 with the generated MIC, sets the security bit to 1 and computes the FCS over the entire WUR frame carried within the WUR PPDU and transmits the secure WUR PPDU 1220. A receiving WUR STA compares the Address field 244 with the saved r_STA' and if there is a match the WUR STA implicitly identifies itself as being the receiver of the WUR frame and also concludes that the frame is an authentic frame transmitted by its AP. The WUR STA also checks against replay attacks by checking that the random number carried in the Address field 244 has never been used in the past and if true proceeds to wake its PCR. The AP again provides a new random number that has never been used before, to the STA using encrypted WUR Action frame to be used for the next secure WUR frame and so on.

Fifth Embodiment

In the first embodiment, it was mentioned that for each WUR STA that negotiates secure WUR mode with an AP, the AP may provide a random number to use as the base number to generate the cryptographic salt for WUR frame types that do not carry a unique number that may be used as salt for the cryptographic computation. Both AP and WUR STA implicitly generate the cryptographic salts to be used for next WUR frames by incrementing their respective base number. As an alternative, in order to reduce the risk of lack of synchronization of the cryptographic salts between the AP and WUR STAs, the AP provides the WUR STA a range of numbers to use as the cryptographic salt. Using a WUR Action frame 1350, the AP may provide the Crypto Salt Base 1366 as well as a Crypto Salt Range Exponent 1368 to use for a particular WUR frame type as indicated by the Frame Type field 1364. As an example, if S_SN represents the value of the Crypto Salt Base 1366 and NUM_SN represents the value of the Crypto Salt Range Exponent 1368, the AP may indicate numbers in the range [S_SN, S_SN+$2^{NUM\_SN}$−1]. Upon receiving the cryptographic salt range, using the specified cryptographic algorithm, the WUR STA may use its secret pairwise Key, the BSSID of its BSS and its WID as RA as inputs to pre-compute the MIC values for each cryptographic salt in the range and save the MIC values in memory for future use during WUR mode. Table 1400 in FIG. 14 shows an example table of MIC values computed by a WUR STA with S_SN=100 and NUM_SN=8. Here the MIC values have been truncated to 16 bits. When the AP needs to wake a WUR STA, the AP uses its secret pairwise Key, for example the Temporal Key (TK) portion of the pairwise secret Key PTK or W-PTK, the BSSID and the Receiver Address (RA) of the recipient WUR STA, and starts with the first CSN in the series as the cryptographic salt as input to the cryptographic algorithm to compute a MIC. The AP replaces the TA field of the secure WUR frame 1500 in FIG. 15 with the generated MIC 1516, sets the security bit to 1 and computes the FCS over the entire WUR frame 1500 and transmits the secure WUR PPDU carrying the WUR frame 1500.

Subsequently when a WUR STA receives the secure WUR frame 1500, it first compares the RA field 1514 with its own WUR ID and if there is a match, it proceeds to compare the WUR frame type and if a MIC table for the frame type exists in its memory, the STA compares the MIC field 1516 with the stored MIC values in ascending order, starting from the last used MIC value and if there is a match the WUR STA implicitly identifies itself as being the receiver of the WUR frame and also concludes that the frame is an authentic frame transmitted by its AP and proceeds to wake its PCR. Once the AP uses up all the cryptographic salt in the specified range, it provides a new range of cryptographic salt to the WUR STA for the use to verify subsequent secure WUR frames.

The process for secure multicast WUR frames is very similar. The AP provides a separate range of cryptographic salt to WUR STAs to verify secure multicast WUR frames. Upon receiving the cryptographic salt range, using the specified cryptographic algorithm, the WUR STA may use its secret Group Key, the BSSID of its BSS and the Group ID of the multicast group that it belongs to as RA as inputs to pre-compute the MIC values for each cryptographic salt in the range and save the MIC values in memory for future use during WUR mode. When the AP needs to wake a group of WUR STAs, the AP uses its Group Key, for example the Temporal Key (TK) portion of the Group Key GTK, IGTK or W-GTK, the BSSID and the Group ID of the recipient multicast group, and starts with the first CSN in the series as the cryptographic salt as input to the cryptographic algorithm to compute a MIC. The AP replaces the TA field of the secure multicast WUR frame 1600 in FIG. 16 with the generated MIC 1616, sets the security bit to 1 and computes the FCS over the entire WUR frame 1600 and transmits the secure WUR PPDU carrying the multicast WUR frame 1600.

Each WUR STA that receives the secure multicast WUR frame 1600 compares the WUR frame type and if a MIC table for the frame type exists in its memory, the STA compares the MIC field 1616 with the stored MIC values in ascending order, starting from the last used MIC value and if there is a match the WUR STA implicitly identifies itself as being one of the receiver of the multicast WUR frame 1600 and also concludes that the frame is an authentic frame transmitted by its AP and proceeds to wake its PCR. Once the AP uses up all the cryptographic salt in the specified range, it provides a new range of cryptographic salts to the group of WUR STAs to use to verify subsequent secure multicast WUR frames.

Sixth Embodiment

A recent IEEE 802.11ba proposal, IEEE 802.111-17/1004r01 proposes a similar idea of creating a secure WUR frame by adding a Message Integrity Check (MIC) field to a WUR frame. The BSSID field which is generally used as an AP's transmitter address (TA) as well as the Timing Synchronization Function (TSF) maintained by the AP and STAs are used as an input for the MIC computation. The MIC is computed over the whole WUR frame using secret group key (e.g., IGTK) and the FCS field is replaced with the computed MIC field. Any error in the WUR frame during transmission will result in the MIC verification failing at the receiver, thereby performing the function of the FCS field. However, the proposal suffers from some drawbacks as explained below:

a) using the TSF as input for the MIC computation would require some pre-processing at both the transmitter (AP) as well as the receivers (WUR STAs) of the secure WUR frames as detailed in the current disclosure as follows.

b) Group keys are meant to be used for broadcast/multicast transmissions and may be known to all associated STAs. IGTK/GTK or any other group key is susceptible to "Insider attack," i.e., attack by a device that is also associated with same AP since it knows the IGTK/GTK. Since the "inside attacker" knows the IGTK, it can easily create forged secure WUR PPDUs with valid MIC.

Figure 17:
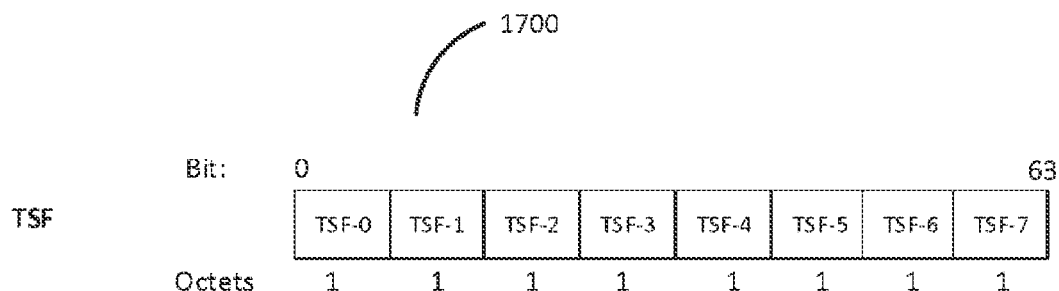
FIG. 17 shows the format of the Timing Synchronization Function (TSF) field as per the sixth embodiment.

FIG. 17 shows the format of a TSF 1700 that is maintained by all IEEE 802.11 devices operating in infrastructure mode. The TSF 1700 is a 64-bits long counter with a time resolution of 1 microsecond and helps all the 802.11 devices in a BSS maintain time synchronization with the AP. An AP periodically broadcasts the current value of its TSF using the Timestamp field of the Beacon frames. Each STA that receives the Beacon frames from the AP that the STA is associated with, replaces its local TSF with the received timestamp after adjusting for the receiver processing delays. For easy referencing, starting from bit 0, the TSF 1700 may be divided into eight octets from TSF-0 to TSF-7 as shown in FIG. 17.

Figure 18:
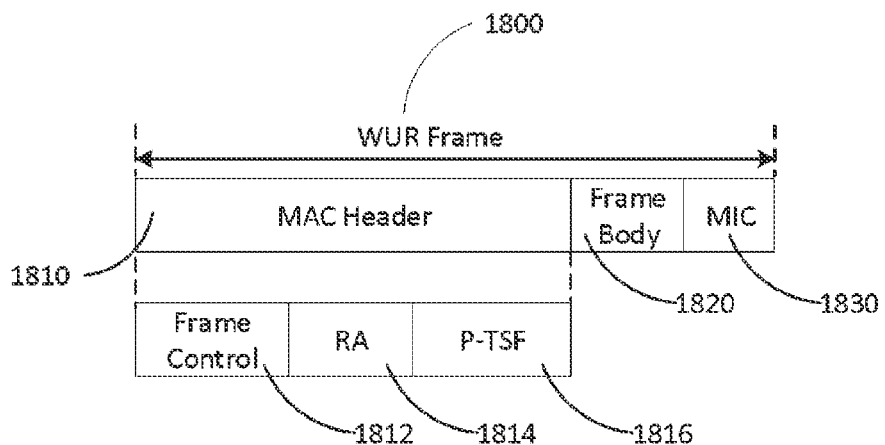
FIG. 18 shows the frame format proposed for secure WUR frames as per the sixth embodiment.

FIG. 18 shows the frame format of a secure WUR frame 1800 as per the sixth embodiment. The Mac header 1810 of the WUR frame 1800 comprises a Frame control field 1812, a Receiver Address (RA) field 1814 and a Partial TSF (P-TSF) field 1816. The frame control field follows the same format as the Frame control field 812 in FIG. 8. In order to differentiate secure WUR frames from unsecure WUR frames, the AP sets the Security bit within the Frame Control field 812 to 1. The Security bit alerts the receiving WUR STA of the presence of a MIC field within the WUR frame. The RA field 1814 may be set to a receiving WUR STA's assigned WUR ID (WID), for example its AID12. The P-TSF field 1816 is used for time synchronization during the WUR mode and the AP may choose to transmit the TSF-1 octet of the TSF 1700 in FIG. 17 as the P-TSF. The Frame body field 1820 is optional and may only be present in certain frame types. In order to create a secure WUR frame, the AP computes a MIC over the entire WUR frame using a pre negotiated cryptographic function and with the TSF as the cryptographic salt. The AP's TA (BSSID) is also used as additional input for the MIC computation. The FCS field of the frame is replaced by the computed MIC field 1830 which serves as an authentication tag and at the same time also serves to detect any error in the WUR frame.

Using the local TSF directly for the MIC computation however is not feasible due to the synchronization loss issue as explained below. Using TSF-1 octet of the TSF 1700 in FIG. 17 as the P-TSF will give a partial timestamp with a resolution of 256 µS and a roll over period of 655360. The choice of the bits of TSF to be used as P-TSF may depend on the WUR deployment scenario and may have been negotiated between the AP and a WUR STA during the initial WUR negotiation phase. If the TSF-1 octet is used as the P-TSF, the TSF-0 fields of the AP and STA cannot be expected to be in synchronization. As such, the TSF bits smaller than the P-TSF should not be used in the MIC computation. In addition, a WUR STA running in WUR mode may not receive the 802.11 Beacon frames very regularly and as such the local TSF maintained by the WUR STA may not be so tightly synchronized with the AP's TSF. Even though the WUR STA uses the partial timestamp carried in the P-TSF fields in broadcast WUR frames such as WUR Beacons to keep the corresponding bits of its local TSF in synchronization, due to the limited number of bits available for the P-TSF field, the partial timestamp will roll over on a regular basis and the higher octets of the TSF will need to be incremented. Due to hardware limitation, both the AP's as well as the WUR STA's clocks are expected to have some clock drift which is expressed as ±ppm (parts per million). Typically, a WUR STA may be implemented using much cheaper hardware components as compared to the AP and are expected to experience a much larger clock drift. Table 1900 in FIG. 19 illustrates an example of the timing synchronization issue that may occur due to the clock drift error when the AP chooses to transmit the TSF-1 octet of the TSF 1700 in FIG. 17 as the P-TSF. The example assumes a total clock drift of ±200 ppm between as AP and a WUR STA, i.e., the AP's and the WUR STA's clock differs by 200 units for every million units. The top half of table 1900 shows the case where the STA's clock is running faster than the AP' clock, while the bottom half shows the opposite case. For sake of brevity, only the TSF-1 octet (8:15 bits) and the TSF-2 octets (16:23 bits) of the TSF are shown. Assuming that the WUR Beacons are transmitted once every 10 seconds, at the end of a 10 seconds period since the last WUR Beacon was received, the WUR STA's clock would have drifted forward almost 2000 µS during this time and its TSF-1:TSF-2 may roll over to 0:201 while the AP's TSF-1:TSF-2 is still at 249:200 as shown in row 1910. The AP's and WUR STA's TSF-2 re-synchronizes to 201 only after seven more units at row 1919. Similarly, in the reverse case the WUR STA's clock would have drifted behind almost 20000 during one WUR Beacon interval and its TSF-1:TSF-2 may still be at 248:200 while the AP's TSF-1:TSF-2 has already roll over to 0:201 as shown in row 1930. The AP's and WUR STA's TSF-2 re-synchronizes to 201 only after seven more units at row 1940. This shows that if the WUR STA missed one WUR Beacon, there is a "TSF misalignment window" of almost 40000 during which the AP's and STA's TSF are misaligned. If the STA missed more WUR Beacons, the "TSF misalignment window" will only grow bigger. In general, n, the maximum number of WUR Beacons that may be skipped and still allows a WUR STA to recover the TSF synchronization is determined by:

$$\text{maximum drift by missing } n \text{ WUR Beacons} \leq (\text{roll over period})/2$$

The roll over period is determined by the number of bits used for the P-TSF field and its resolution and is calculated as $2^{l}*r$, where l is the number of bits used for the P-TSF and r is the resolution of P-TSF. Since a WUR STA would need to use the exact same value of TSF as used by the AP in order to correctly verify the MIC, both the AP and WUR STAs need to pre-process the respective local TSF to factor in the impact of the clock drift before using the TSF as an input for the MIC computation. In general, the following step can be taken to rectify the TSF misalignment during the "TSF misalignment window":

If the P-TSF in the received WUR frame is greater than the STA's corresponding TSF bits by more than (roll over period)/2 units, the STA can assume that the STA's clock is faster and a roll over has occurred at the STA and can adjust its higher TSF octets by decrementing by one.

Similarly, if the P-TSF in the received WUR frame is lesser than the STA's corresponding TSF bits by (roll over period)/2 units or more, the STA can assume that the STA's clock is slower and a roll over has occurred at the AP and can adjust its higher TSF octets by incrementing by one. For our example, using TSF-1 octet of the TSF 1700 in FIG. 17 as the P-TSF, the roll over period can be calculated as $2^{8}*256$ μS=65536 μS. Hence, the maximum number of WUR beacons that may be missed may be computed to be 16 which translate to a maximum "TSF misalignment window" of 32000 μS=125 units at P-TSF resolution of 256 μS. The following step can be taken to rectify the TSF misalignment during the "TSF misalignment window":

If the P-TSF in the received WUR frame is greater than the STA's TSF-1 octet by more than 125 units, the STA can assume that the STA's clock is faster and a roll over has occurred at the STA and can adjust its higher TSF octets by decrementing by one.

Similarly, if the P-TSF in the received WUR frame is lesser than the STA's TSF-1 octet by more than 125 units, the STA can assume that the STA's clock is slower and a roll over has occurred at the AP and can adjust its higher TSF octets by incrementing by one.

Figure 20:
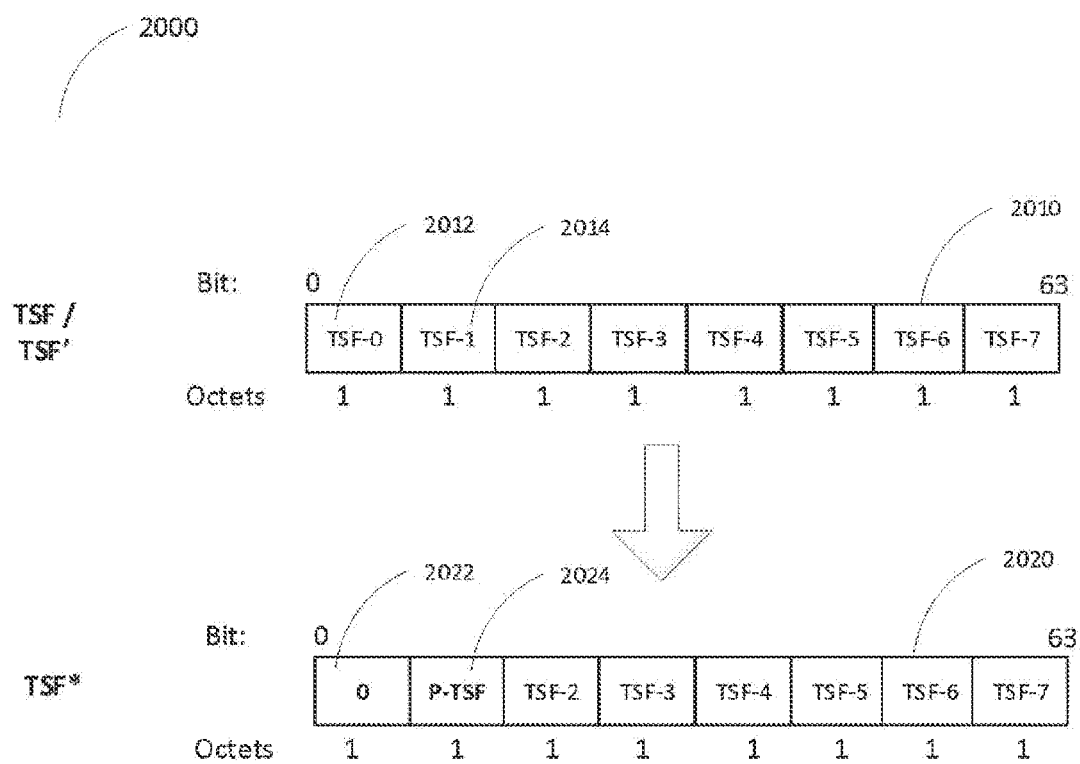
FIG. 20 shows the intermediate process of creating the TSF field for input to the WUR authentication module as per the sixth embodiment.

Referring to FIG. 20, the above mentioned pre-processing of TSF is illustrated schematically. 2010 represents the local TSF maintained by an AP (TSF) or a WUR STA (TSF'). 2020 represents the copy of the local TSF (TSF*) after going through the pre-processing. When TSF-1 is used as the P-TSF field by the AP, at the AP, the TSF-0 bits are masked to all zeroes to form TSF* and the TSF-1 octet is copied to the P-TSF field 1816 in FIG. 18. TSF* is then used as the cryptographic salt for the MIC computation and the FCS field of the WUR frame 1800 is replaced with the computed MIC 1830. At the receiving WUR STA, a copy TSF* is made of the local TSF' and the TSF-0 octet 2022 is masked to all zeroes. Next the TSF-1 octet 2024 is replaced by the P-TSF field 1816.

If the WUR frame 1800 in FIG. 18 is a unicast frame, the AP uses its secret Key, for example the Temporal Key (TK) portion of the pairwise secret Key PTK or W-PTK, the BSSID as well as the pre-processed TSF* as input to the cryptographic algorithm to compute the MIC over the entire WUR frame except the FCS field (i.e., the MAC header 1810 as well as the optional Frame Body 1820 if it exists). Usually, the output of a standard cryptographic function may be too long to directly use in WUR PPDUs and may need to be truncated to fit the limited size of the WUR frames.

For example, if the AP uses a cryptographic hash function SHA-256 to generate the MIC, the cryptographic process at the AP may be summarized as:

MIC=Truncate-$L$(SHA-256(TK∥WUR Frame*∥BSSID∥TSF*))

TK=Temporal Key (TK) portion of the pairwise secret Key PTK or W-PTK and its length depends on the Cipher suite selected during the 4 way handshake, for example 128 bits for CCMP-128, etc.
WUR Frame*=the MAC header 1810 as well as the optional Frame Body 1820
BSSID=the Basic Service Set Identifier (BSSID) of the BSS)=MAC address of the AP
Truncate-$L$=function to truncate the output of the SHA-256 function (128 bits) to L bits.
L=number of bits of the FCS field 252
x∥y=concatenation of x and y The AP replaces the FCS field of the WUR frame 1800 with the generated MIC 1830, and transmits the secure WUR frame 1800.

At a receiving WUR STA, when it receives the secure WUR frame 1800 and after determining it to be a unicast WUR frame, confirms that the RA field 1814 matches the STA's WID. If the RA matches, the STA uses its secret key, for example the Temporal Key (TK') portion of the pairwise secret Key PTK or W-PTK, its BSSID' as well as the pre-processed TSF* as input to the cryptographic algorithm over the entire WUR frame except the FCS field (i.e., the MAC header 1810 as well as the optional Frame Body 1820 if it exists) to obtain a MIC'. For example, if the AP had indicated during the initial WUR mode negotiation that SHA-256 is to be used as the Cipher suite to use for pairwise communication, the cryptographic process at the STA may be summarized as:

MIC'=Truncate-$L$(SHA-256(TK'∥WUR Frame*∥BSSID'∥TSF*))

If the computed MIC' matches MIC field of the secure WUR frame carried by the WUR frame 1800, the WUR STA implicitly identifies itself as being the receiver of the WUR frame and also concludes that the frame is an authentic frame transmitted by its AP and proceeds to wake its PCR.

Figure 21:
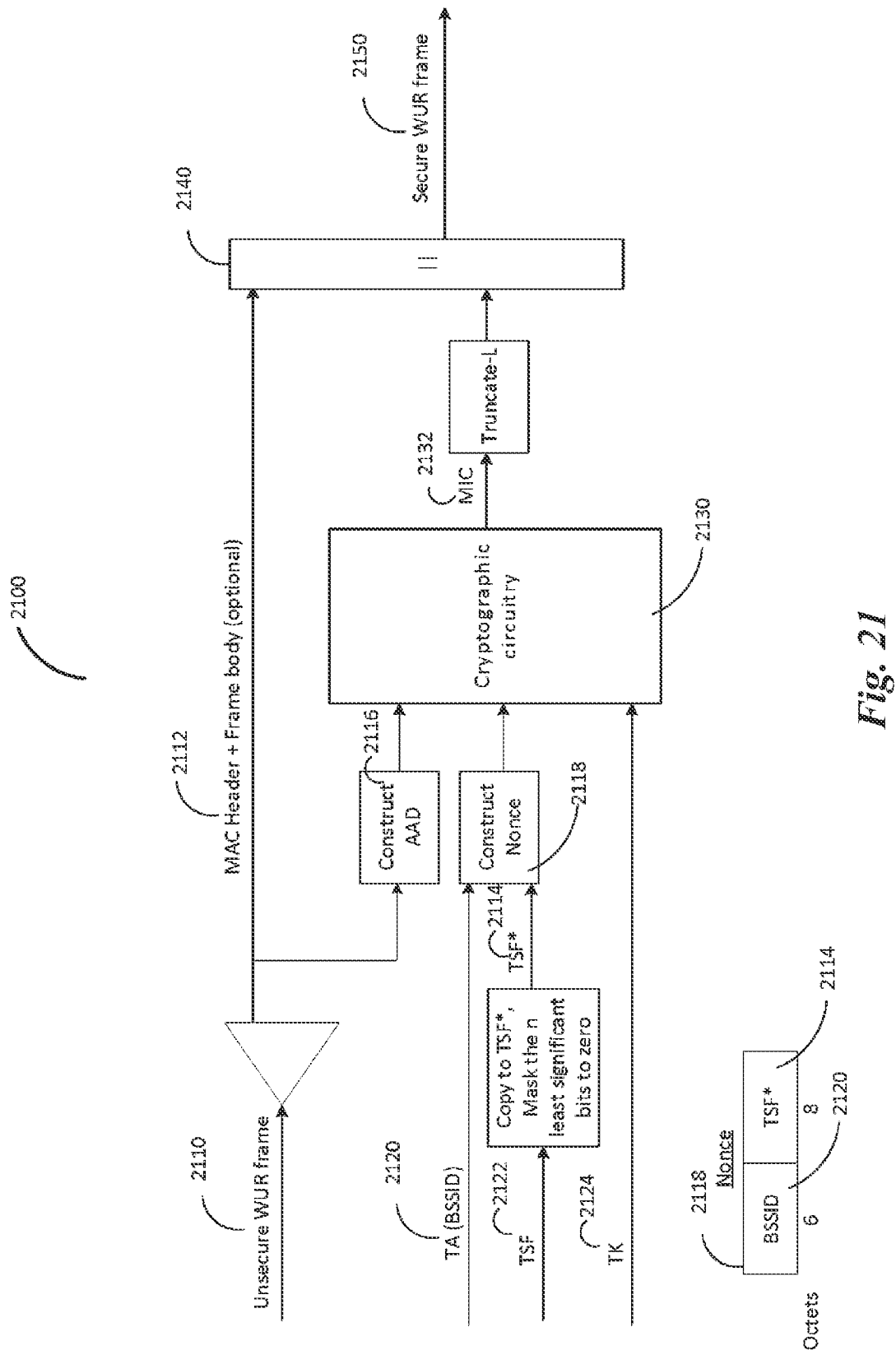
FIG. 21 shows an example process to create secure WUR frames at the transmitter side as per the sixth embodiment.

Referring to FIG. 21, an alternate method 2100 of generating a secure WUR frame by reusing the 802.11 CCMP cryptographic encapsulation is illustrated. Even though a simple cryptographic hash function could be used to produce a MIC for authentication of WUR frames, the AP may also choose to reuse the IEEE 802.11 CCMP cryptographic encapsulation used to encrypt PCR transmission to generate the MIC field 1830. Although the IEEE 802.11 CCMP cryptographic encapsulation is used during PCR to encrypt Data frames and Management frames, it also generates a MIC to authenticate the contents of the MAC headers. Even though WUR frames do not need to be encrypted, the IEEE 802.11 CCMP cryptographic encapsulation process can be reused to generate the MIC used for authenticating WUR frames. The AP can specify that CCMP is to be used to generate the MIC during the WUR mode negotiation by specifying in the WUR Security element 520 in FIG. 5 that CCMP-128 in table 700 in FIG. 7 is to be used as the cipher suite. A secure WUR frame is generated using CCMP using following steps:

a) The TSF 2122 is preprocessed as described earlier by creating a copy TSF* and masking the n least significant bits (LSB) of TSF* to zero, where n is the bit index of the LSB of the P-TSF. For example if TSF-1 is used as the P-TSF, n=8 and the 8 LSB of TSF, i.e., bit-0 to bit-7 are masked to zero.

b) The unsecure WUR frame 2110 is marked as a secure WUR frame by setting the Security bit 814 in the Frame Control field 812 in FIG. 8 and the entire WUR frame (including the optional frame body 1820 in FIG. 18, if present) is used as the Additional Authentication Data (AAD) 2116.

c) A CCM Nonce block 2118 is constructed from the BSSID 2120 and the TSF* 2114.

d) The AAD 2116, the Nonce block 2118 and the AP's Temporal Key (TK) 2124 are fed to the Cryptographic circuitry 2130, which in this case is the CCM encryption module to obtain the MIC 2132.

e) The generated MIC 2132 is then truncated to fit the FCS field 252 in FIG. 2.

f) Finally, the Secure WUR frame 2150 is formed by appending the MIC 2132 to the MAC Header and frame body 2112.

Figure 22:
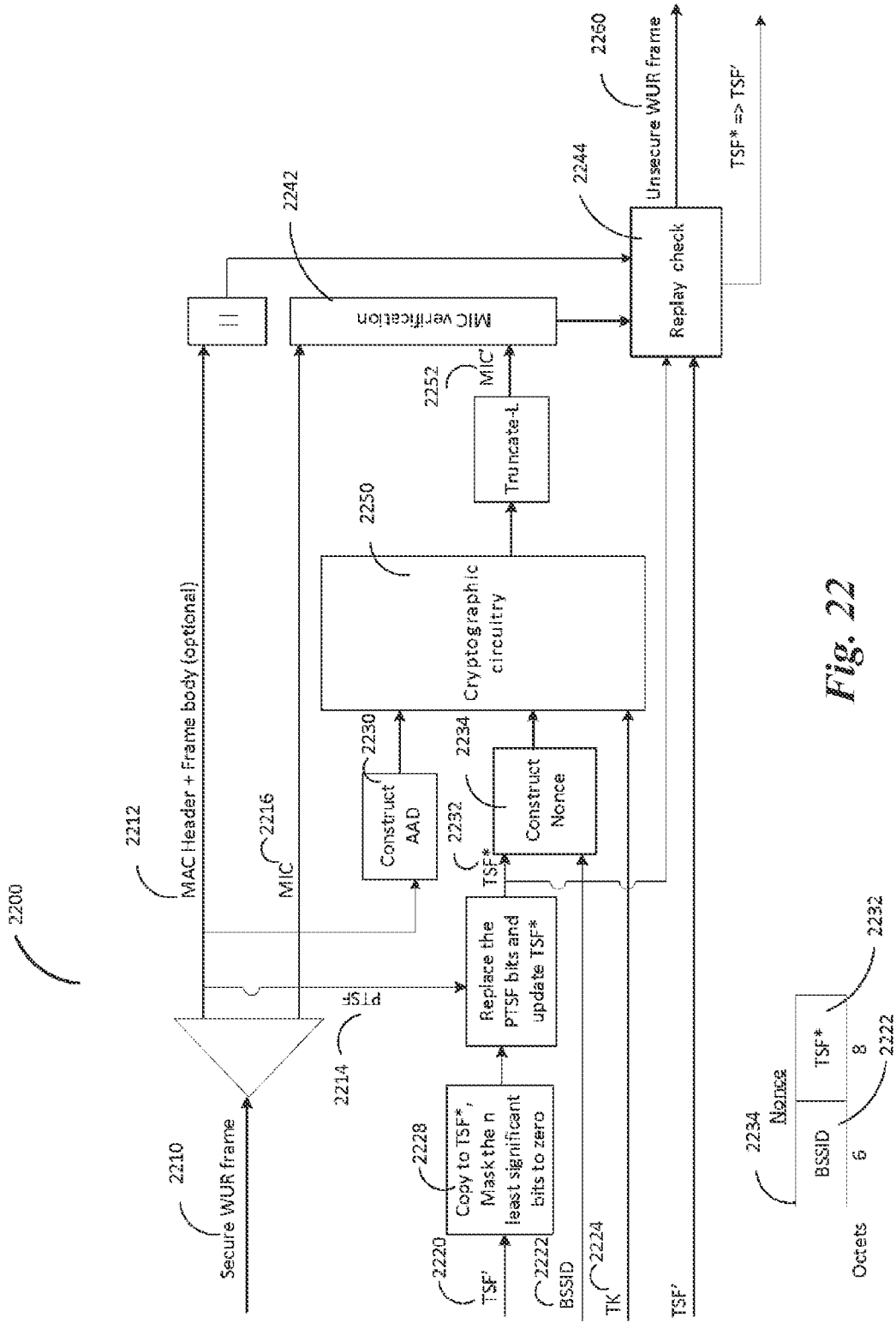
FIG. 22 shows an example process to verify secure WUR frames at the receiver side as per the sixth embodiment.

The procedure of authenticating a secure WUR frame at the receiving WUR STA using the CCMP cryptographic function is illustrated in FIG. 22. A WUR STA authenticates a secure WUR frame using following steps:

a) The secure WUR frame 2210 is parsed to separate the MAC Header and frame body 2212, The P-TSF 2214 and the MIC field 2216.

b) The MAC Header and frame body 2212 are used as the Additional Authentication Data (AAD) 2230.

c) The local TSF' 2220 is preprocessed as described earlier by creating a copy TSF* and masking the n least significant bits (LSB) of TSF* to zero, where n is the bit index of the LSB of the P-TSF. For example if TSF-1 is used as the P-TSF, n=8 and the 8 LSB of TSF, i.e., bit-0 to bit-7 are masked to zero. The bits corresponding to the P-TSF field are replaced with the P-TSF 2214 and the higher bits of the TSF* are adjusted for clock drift (TSF misalignment) as described earlier to form the pre-processed TSF* 2232.

d) CCM Nonce block 2234 is constructed from the BSSID 2222 and the TSF* 2232.

e) The AAD 2230, the Nonce block 2234 and the STA's Temporal Key (TK) 2224 are fed to the Cryptographic circuitry 2250, which in this case is the CCM encryption module to obtain a MIC.

f) The generated MIC is truncated to the length of the FCS field 252 in FIG. 2 to form MIC' 2252. The MIC' is compared with the MIC 2216 from the secure WUR frame 2210 and if the two are the same, the MIC verification passes and the WUR frame is deemed authentic. The MIC verification also ensures that the WUR frame is error free.

g) Since the TSF is used in the computation of the MIC, the MIC verification also acts as implicit replay check. However, as an added replay protection measure, the local TSF' and the processed TSF* may undergo further replay check, for example by ensuring that the difference between TSF' and TSF* is less than the P-TSF roll over period. If the replay check 2244 passes, the MAC Header and frame body 2212 is passed for further processing as an authentic unsecure WUR frame 2260. At this time, the local TSF' may also be updated with the processed TSF* after accounting for delay if any during the cryptographic verification process.

Figure 23:
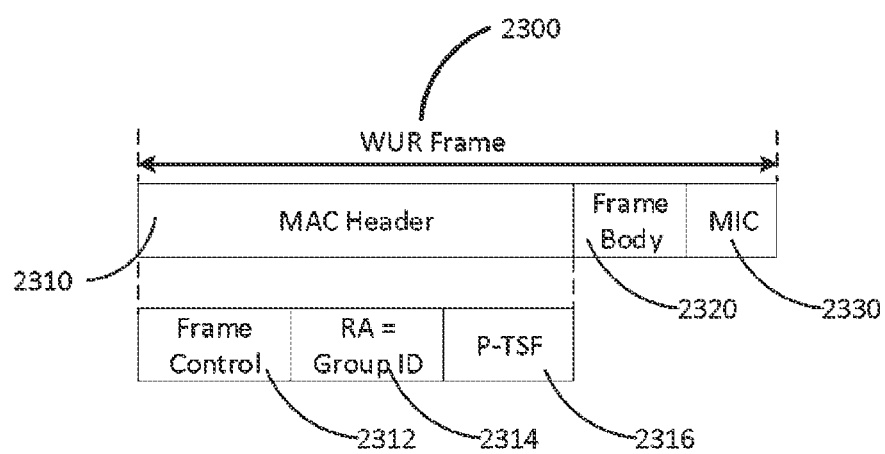
FIG. 23 shows a frame format proposed for secure multicast WUR frames as per the sixth embodiment.

Referring to FIG. 23, one option for a secure multicast frame 2300 is illustrated. As mentioned earlier, multicast WUR frames are addressed to a group of WUR STAs and as such Group Key that is known to all the STAs of the multicast group has to be used to create secure multicast frames. Usually in one infrastructure BSS, only one GTK and one IGTK is generated at a time, and all the STAs in the BSS that has negotiated secure transmission with the AP would have received the Group Keys from the AP. However, use of Group Key leads to vulnerability to "Insider attack," i.e., attack by another device that is also associated with the same AP since it knows the IGTK/GTK. Since the "inside attacker" knows the GTK/IGTK, it can easily create forged secure WUR PPDUs with valid MIC. In order to lessen the risk of the so called "Insider attack," every time a new multicast group is formed, the AP derives a new set of Group Key (either GTK or IGTK) that is associated with that particular multicast group, and with the Group ID assigned to the multicast group. The WUR Security element 520 may be used to transfer the Group Key to each member of the multicast group. The Group ID field 568 in this case is set as the Group ID assigned to the multicast group and the encrypted Group Key is carried within the Wrapped Key field 580. The AP creates the secure multicast WUR frame 2300 in the same way that it creates a secure unicast WUR frame, except that the RA field 2314 is set to the Group ID of the multicast Group and the MIC field 2330 is computed using the Group Key assigned to the particular multicast Group instead of using the common Group Key used for broadcast frames. At the receiving WUR STAs, if the RA field 2314 of a secure multicast WUR frame matches the Group ID of a multicast group that the STA belongs, the STA uses the Group key associated with the multicast group to compare the MIC and authenticate the multicast WUR frame. Only if the MIC verification passes, the multicast WUR frame is processed and the STA may proceed to wake its PCR. Using different Group Keys for different multicast groups limit the scope of an "insider attack" to a particular multicast group since an attacker that belong to one multicast group does not possess the Group Key for another multicast group and hence would be unable to launch an "inside attack."

Figure 24:
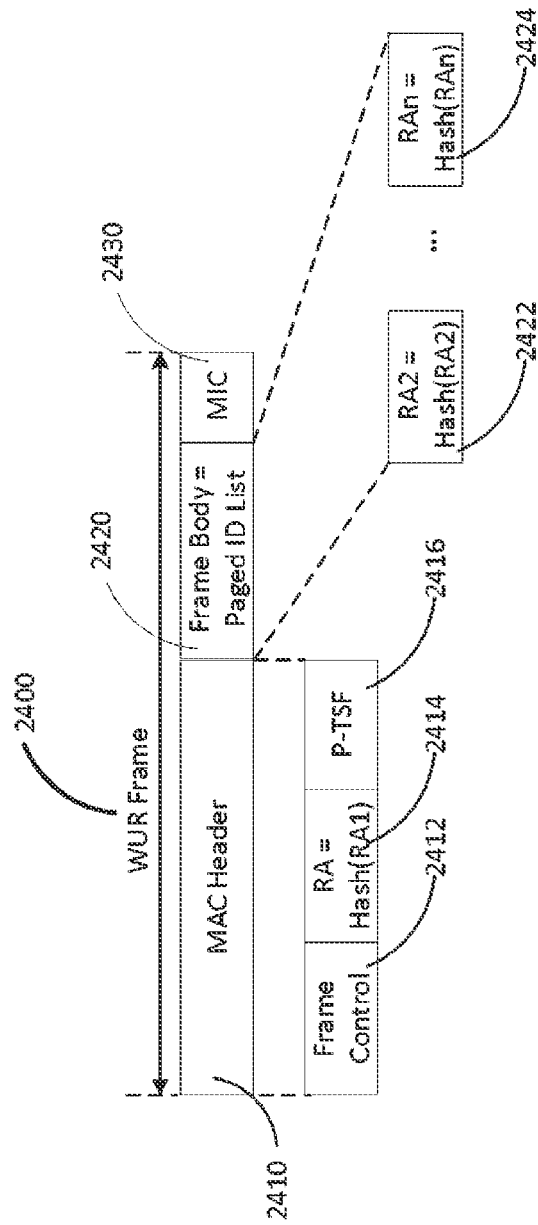
FIG. 24 shows an alternate frame format proposed for secure multicast WUR frames as per the sixth embodiment.

Referring to FIG. 24, an alternate option for a secure multicast frame 2400 is illustrated. This option is applicable if the multicast groups are not assigned a Group ID but rather the targeted recipients of a multicast WUR frame are identified by including a Paged list of the RAs of the group member STAs, or if the multicast frame is only addressed to few STAs of a multicast group. The RA field of the multicast frame may be set to the multicast Group ID, if assigned; else it may be set as the RA of one of the member STA of the multicast Group. The WUR frame in this case carries a frame body and this is indicated using a non-zero value in the Length field 815 in FIG. 8. The frame body carries the list of the RAs of the rest of the multicast STAs addressed by the frame. For such multicast frame format, a two-tier authentication may be used to create a secure multicast WUR frame at the AP using:

a) First, a hash value is created for each of the RA of the addressed STAs by using the Temporal Key (TK) portion of the pairwise secret Key PTK or W-PTK negotiated between the AP and each STA. For example, if RA1 represent the RA of a STA, TSF* represents the processed TSF as explained earlier, and assuming SHA-256 is used as the hash function, a hash RA may be created at the AP as:

RA=Truncate-$L$(SHA-256(TK||RA1||BSSID||TSF*))

$L$=number of bits of the address field 244 in FIG. 2 b) Each of the RA field of the unsecure multicast WUR frame is replaced with the corresponding computed hash values 2414, 2422 . . . 2424, and the security bit within the Frame Control field 2412 is set to 1.

c) Second, the MIC is computed using the Group Key over the entire WUR frame 2400, except for the FCS field, similar to the procedures described earlier and the FCS field is replaced with the generated MIC 2430.

At a receiving WUR STA, if the STA belongs to a multicast group, a MIC' is computed using the Group Key over the entire WUR frame 2400, except for the FCS field, similar to the procedures described earlier. If the computed MIC' matches the MIC field 2430, the STA creates a hash value of its WID by using the Temporal Key (TK') portion of the pairwise secret Key PTK or W-PTK negotiated between the AP and the STA. For example, if RA1 represent the WID of the STA, TSF* represents the processed TSF as explained earlier, and assuming SHA-256 is used as the hash function, a hashed RA may be created at the STA as:

RA=Truncate-$L$(SHA-256(TK'||RA1||BSSID'||TSF*))

$L$=number of bits of the address field 244 in FIG. 2

The STA next compares each RA field in the multicast WUR frame 2400 with the hashed RA and if there is a match, the WUR STA implicitly identifies itself as being one of the receiver of the multicast WUR frame and proceeds to further process the frame, for example to wake its PCR.

Figure 25:
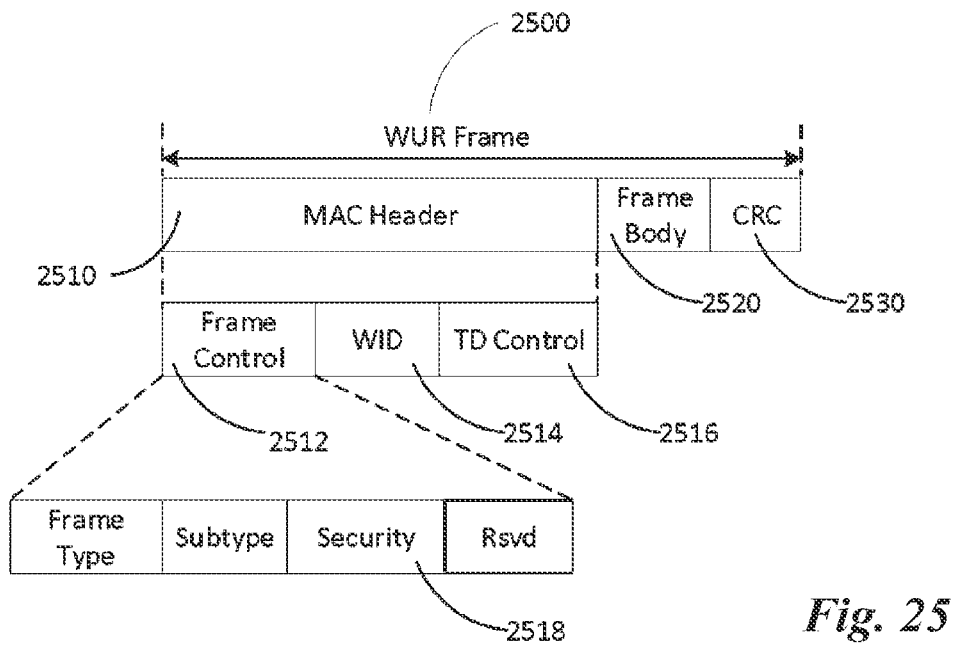
FIG. 25 shows the frame format proposed for unsecure WUR frames as per the sixth embodiment.

Referring to FIG. 25, the frame format of an unsecure WUR frame 2500 is illustrated. Although, similar in structure to a secure WUR frame, an unsecure WUR frame need not carry the P-TSF in the TD Control field 2516. Also, the FCS field is used to carry the Cyclic Redundancy Check (CRC) 2530 which is computed over the whole WUR frame in order to detect errors during transmission. Since the WUR frame is comparatively short, 8 to 12 bits of CRC should suffice and as such the FCS field for an unsecure WUR frame can be shorter than the FCS field in a secure WUR frame that carries a MIC. For example, assuming a 12 bits P-TSF field, a 12 bits long CRC field and a 16 bits long MIC, an unsecure WUR frame can be shorter than a secure WUR frame by 16 bits. In closed door application where security is not a big concern, having different sizes for secure and unsecure WUR frame may help WUR STAs save more power due to the shorter lengths of unsecure WUR frames.

Seventh Embodiment

Figure 26:
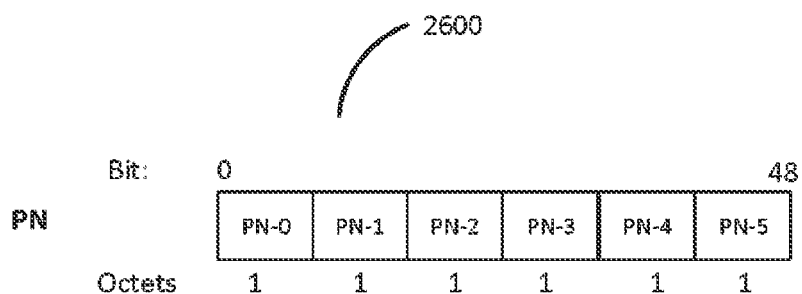
FIG. 26 shows the format of the Packet Number (PN) field as per the seventh embodiment.

Instead of using a timestamp as a replay protection, it is also possible to use a monotonically increasing sequence number or a packet number to achieve replay protection. FIG. 26 shows a 48 bit long Packet Number (PN) that may be used to provide replay protection for WUR PPDUs. For the ease of referencing, the PN may be divided into 6 octets and referred to as PN-0, PN-1, PN-2, PN-3, PN-4 and PN-5, with PN-0 being the lowest octet and PN-5 being the highest octet. With 48 bits, the PN is enough to provide a unique number to the WUR PPDUs without having to worry about roll over of the PN number space. The AP maintains a unique PN for every secret Key that it negotiates for transmission of secure WUR PPDUs and makes sure that for a given secret Key, the PN is never repeated during the transmission of WUR PPDUs. If separate secret Keys are negotiated exclusively for use with WUR PPDUs, the PNs maintained for WUR PPDUs are different from the ones used during PCR. Since the WUR PPDU has limited number of bits available to carry the packet number, only a portion of the PN is carried by the WUR PPDUs, while the remaining bits of the PN is maintained locally. The portion of the PN that is carried by the WUR PPDUs may be referred to as Partial PN (P-PN). For example, only the PN-0 octet may be carried in the WUR PPDUs while the rest of the PN octets are not transmitted. Each WUR STA that has negotiated secure WUR PPDUs maintains a local PN and every time a valid secure WUR PPDU is received, the WUR STA replaces the corresponding bits of the PN with the P-PN received in the WUR PPDU. If separate secret Keys are negotiated exclusively for use with WUR PPDUs, the PNs maintained for WUR PPDUs are different from the ones used during PCR. If the value of the received P-PN is less than the value of the corresponding bits of the PN, the higher bits of the PN is incremented by one to account for rollover of the P-PN bits.

Figure 27:
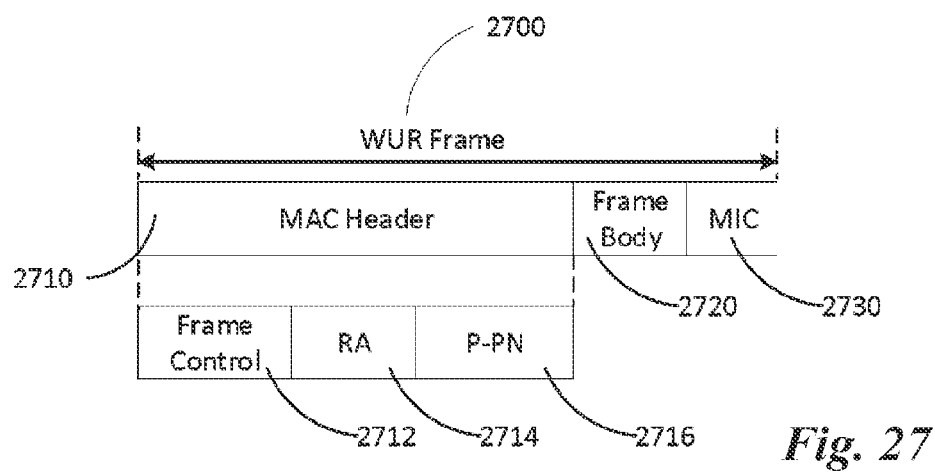
FIG. 27 shows a frame format proposed for secure WUR frames as per the seventh embodiment.

FIG. 27 shows the frame format of a secure WUR frame 2700 as per the seventh embodiment. The Mac header 2710 of the WUR frame 2700 consists of a Frame control field 2712, a Receiver Address (RA) field 2714 and a Partial PN (P-PN) field 2716. The frame control field follows the same format as the Frame control field 812 in FIG. 8. In order to differentiate secure WUR frames from unsecure WUR frames, the AP sets the Security bit within the Frame Control field 2712 to 1. The Security bit alerts the receiving WUR STA of the presence of a MIC field within the WUR frame. The RA field 2714 may be set to a receiving WUR STA's assigned WUR ID (WID), for example its AID12. The P-PN field 1816 is used as a partial packet number and the AP may choose to transmit the PN-0 octet of the PN 2600 in FIG. 26 as the P-PN. The Frame body field 2720 is optional and may only be present in certain frame types. In order to create a secure WUR frame, the AP computes a MIC over the entire WUR frame using a pre negotiated cryptographic function and with the PN associated with the secret Key used for the MIC computation as the cryptographic salt. The AP's TA (BSSID) is also used as additional input for the MIC computation. The FCS field of the frame is replaced by the computed MIC field 2730 which serves as an authentication tag and at the same time also serves to detect any error in the WUR frame.

If the WUR frame 2700 in FIG. 27 is a unicast frame, the AP uses its secret Key, for example the Temporal Key (TK) portion of the pairwise secret Key PTK or W-PTK, the BSSID as well as the PN associated with the pairwise secret Key as input to the cryptographic algorithm to compute the MIC over the entire WUR frame except the FCS field (i.e., the MAC header 2710 as well as the optional Frame Body 2720 if it exists).

For example, if the AP uses a cryptographic hash function SHA-256 to generate the MIC, the cryptographic process at the AP may be summarized as:

$$MIC = \text{Truncate-}L(\text{SHA-256}(TK\|WUR\ Frame^*\|BSSID\|PN))$$

TK=Temporal Key (TK) portion of the pairwise secret Key PTK or W-PTK and its length depends on the Cipher suite selected during the 4 way handshake, for example 128 bits for CCMP-128, etc.
WUR Frame*=the MAC header 1810 as well as the optional Frame Body 1820
BSSID=the Basic Service Set Identifier (BSSID) of the BSS)=MAC address of the AP
Truncate-L=function to truncate the output of the SHA-256 function (128 bits) to L bits.
L=number of bits of the FCS field 252
x∥y=concatenation of x and y The AP replaces the FCS field of the WUR frame 2700 with the generated MIC 2730, and transmits the secure WUR frame 2700.

At a receiving WUR STA, when it receives the secure WUR frame 2700 and after determining it to be a unicast WUR frame, confirms that the RA field 2714 matches the STA's WID. If the RA matches, the STA uses its secret key, for example the Temporal Key (TK') portion of the pairwise secret Key PTK or W-PTK, its BSSID' as well as the local PN' (after updating with the received P-PN 2716) as input to the cryptographic algorithm over the entire WUR frame except the FCS field (i.e., the MAC header 2710 as well as the optional Frame Body 2720 if it exists) to obtain a MIC'. For example, if the AP had indicated during the initial WUR mode negotiation that SHA-256 is to be used as the Cipher suite to use for pairwise communication, the cryptographic process at the STA may be summarized as:

$$MIC' = \text{Truncate-}L(\text{SHA-256}(TK'\|WUR\ Frame^*\|BSSID'\|PN'))$$

If the computed MIC' matches MIC field of the secure WUR frame carried by the WUR frame 2700, the WUR STA implicitly identifies itself as being the receiver of the WUR frame and also concludes that the frame is an authentic frame transmitted by its AP and proceeds to wake its PCR.

Figure 28:
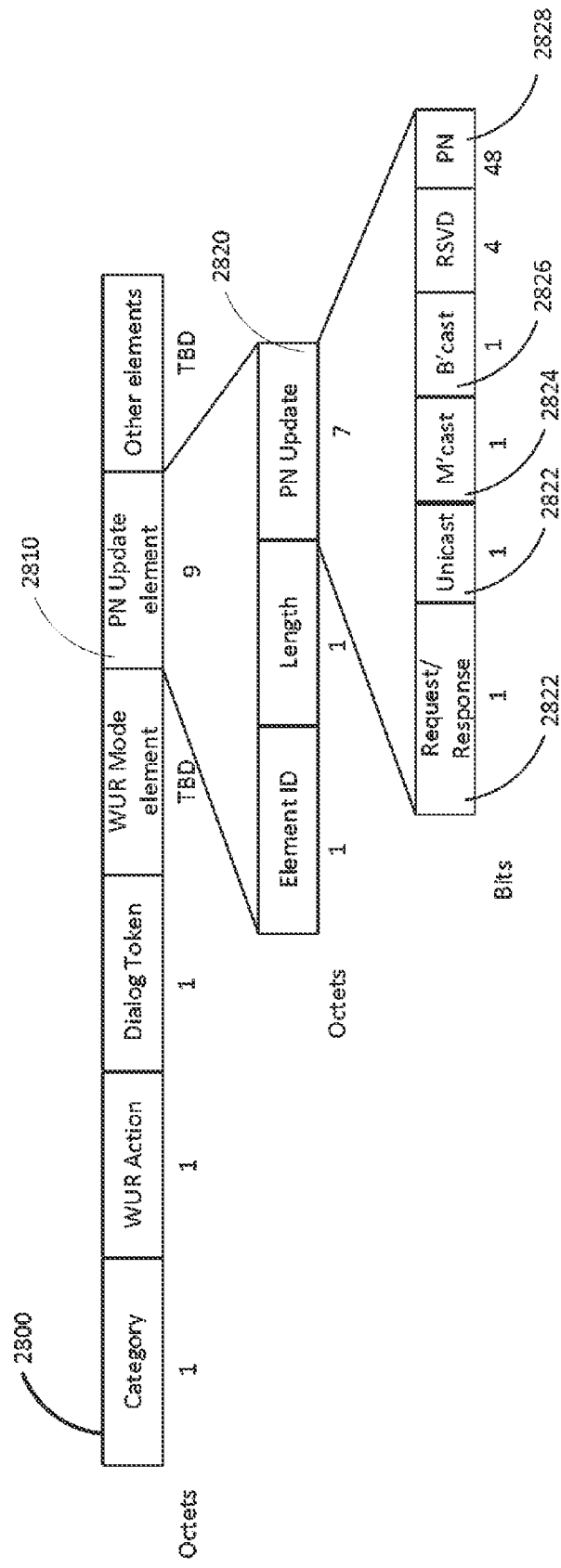
FIG. 28 shows a frame format proposed for updating the PN field as per the seventh embodiment.

Even though a WUR STA tries to keep its local PN synchronized with the AP's PN, at times the two may be out of synchronization. This would lead to MIC verification failure at the WUR STA and a WUR PPDU would turn up with corrupted MIC at the STA. A WUR STA may detect a PN synchronization issue when it keep receiving WUR PPDUs with a RA field that matches its WID but the MIC verification keeps failing. In order to recover from such PN synchronization issue, a WUR STA may transmit a WUR Action frame 2800 in FIG. 28 to the AP to request a PN update. The WUR Action frame 2800 is the same as the WUR Action frame 500 in FIG. 5 with an additional PN update element 2810. A WUR STA sets the Request/Response bit 2822 in the PN Update field 2820 to Request to request a PN update. The STA also sets the Unicast bit 2822, Multicast bit 2824 or the Broadcast bit 2826 to indicate which PN update it is requesting. Upon receiving a request for PN update, the AP transmits the WUR Action frame 2800 with the Request/Response bit 2822 in the PN Update field 2820 set to Response and the PN field 2824 carrying the value of the PN maintained by the AP for the corresponding Key (unicast, multicast or broadcast). Upon receiving the PN update element, the WUR STA replaces its local PN with the PN field 2828.

Eight Embodiment

Figure 29:
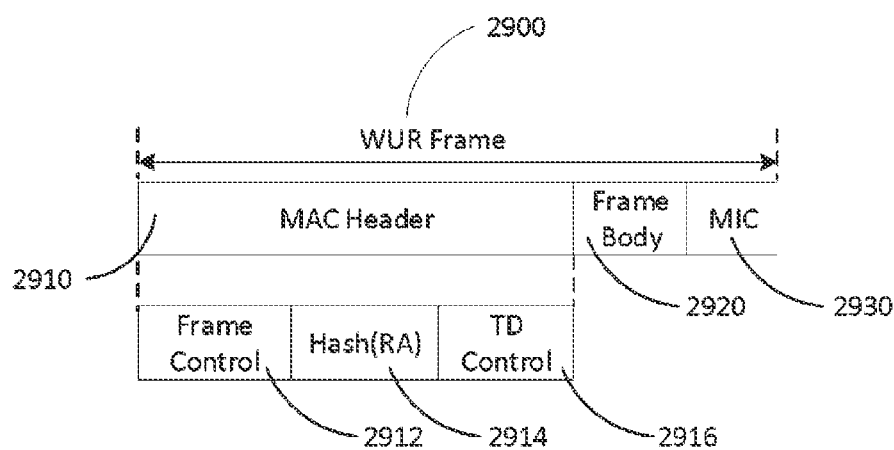
FIG. 29 shows a frame format proposed for secure WUR frames as per the eight embodiment.

Referring to FIG. 29, a hybrid solution is presented for secure transmission of WUR frames that do not carry a unique number that may be used as salt for the cryptographic computation. A secure WUR frame 2900 may be created as a two-step process. In the first step, the RA field of the MAC Header 2910 is replaced with a cryptographic hash value 2914. The hash value may be computed by running the cryptographic function over the RA field with a random cryptographic salt that is known to both the AP and the WUR STA, but not transmitted in the WUR frame 2900. The random cryptographic salt may be shared between the AP and WUR STA as disclosed in the first, third or the fifth embodiment. In the second step, the MIC field 2930 is computed over the entire WUR frame except the FCS field as disclosed in the sixth and the seventh embodiment. The FCS field is then replaced with the MIC field 2930. At a receiving WUR STA, first it is verified that the MIC field 2930 is valid and if it is, the hashed RA field 2914 is compared with a locally computed hash value. If the two hash values are identical, the STA identifies itself as a recipient of the WUR frame 2900 and may proceed to wake its PCR. As long a unique cryptographic salt is used for the computation of the hashed RA field 2914, it can be ensured that the MIC field 2930 will be different for each WUR frame and hence a replay attack may be thwarted.

Configuration of an Access Point

Figure 30:
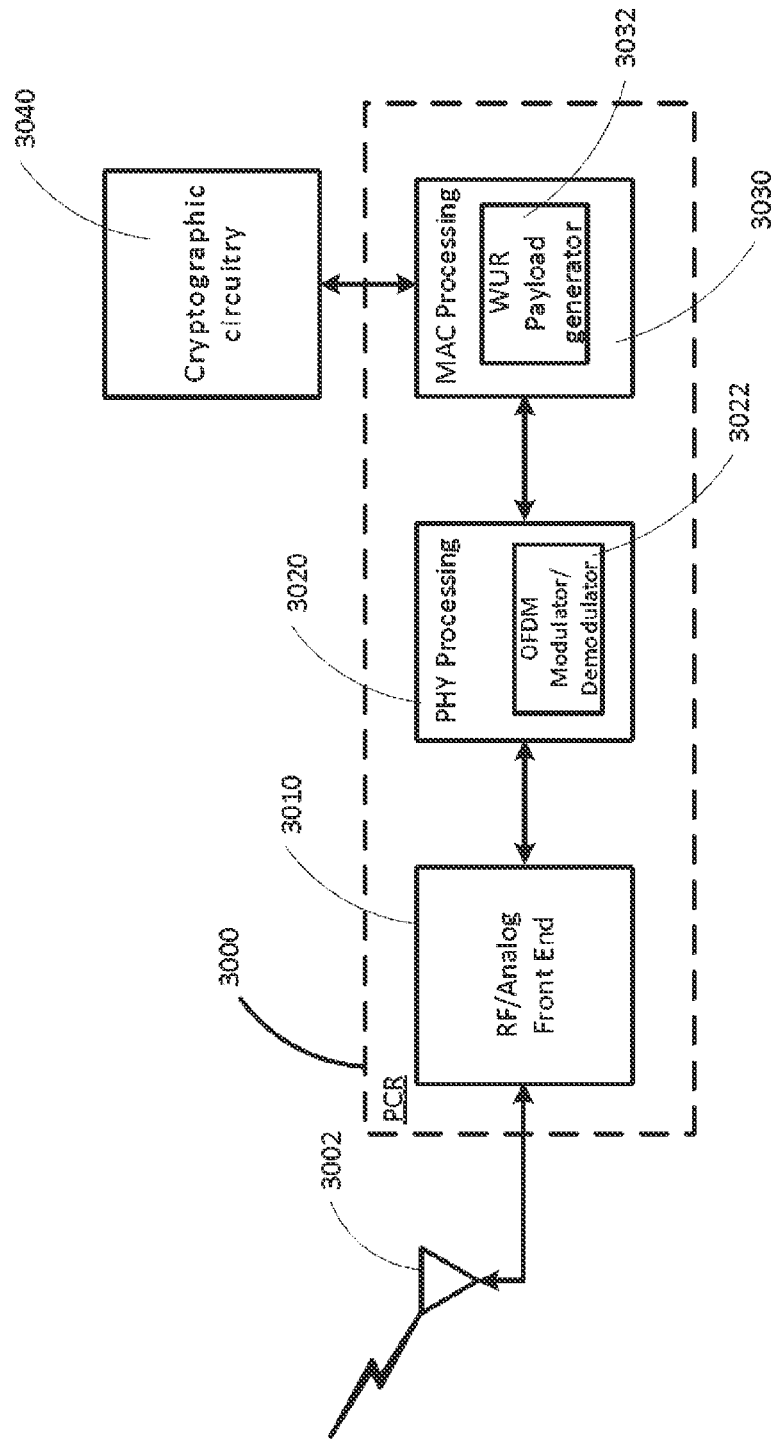
FIG. 30 is a simplified block diagram of an example AP that implements the disclosed transmission scheme.

FIG. 30 is a block diagram of the PCR 3000 of an example AP that implements the secure transmission scheme described in the present disclosure. The AP may be the AP 110 in FIG. 1. The PCR 3000 is connected to the antenna 3002, and is used for the transmission and reception of 802.11 signals as well as for the transmission of wakeup signals. PCR 3000 is comprised of an RF/Analog front end 3010, a PHY Processing unit 3020 and a MAC processing unit 3030 which is connected to a Cryptographic circuitry 3040.

The RF/Analog front end 3010 is responsible for transfer of analog signals to/from the antenna 3002 and may comprise sub-components such as Automatic Gain Control (AGC), Low Pass Filter (LPF), Analog-to-Digital Converter (ADC) and so on.

The PHY Processing unit 3020 is responsible for the processing of the PHY layer signals and is further comprised of the OFDM modulator/demodulator unit 3022. The OFDM modulator/demodulator 3022 is responsible for the OFDM modulation of transmit signals or demodulation of received OFDM signals. On the transmission side, aside from applying OFDM modulation to 802.11 PPDUs, the OFDM modulator/demodulator 3022 is also used to generate WUR signal (e.g., OOK) by populating selected OFDM subcarriers.

The MAC Processing unit 3030 is responsible for various MAC related processing such as retransmission, fragmentation, aggregation, etc. In addition, the MAC Processing unit 3030 also incorporates the WUR payload generator 3032 which is responsible for generating the contents of the payload carried in WUR packets transmitted by the AP.

The Cryptographic circuitry 3040 is used for the cryptographic computation to create secure WUR PPDUs. An AP uses the Cryptographic circuitry 3040 to generate the Message Integrity Code (MIC) to be used in secure WUR PPDUs. The Cryptographic circuitry 3040 may also be used for encryption and decryption of protected 802.11 frames during the PCR mode.

Figure 31:
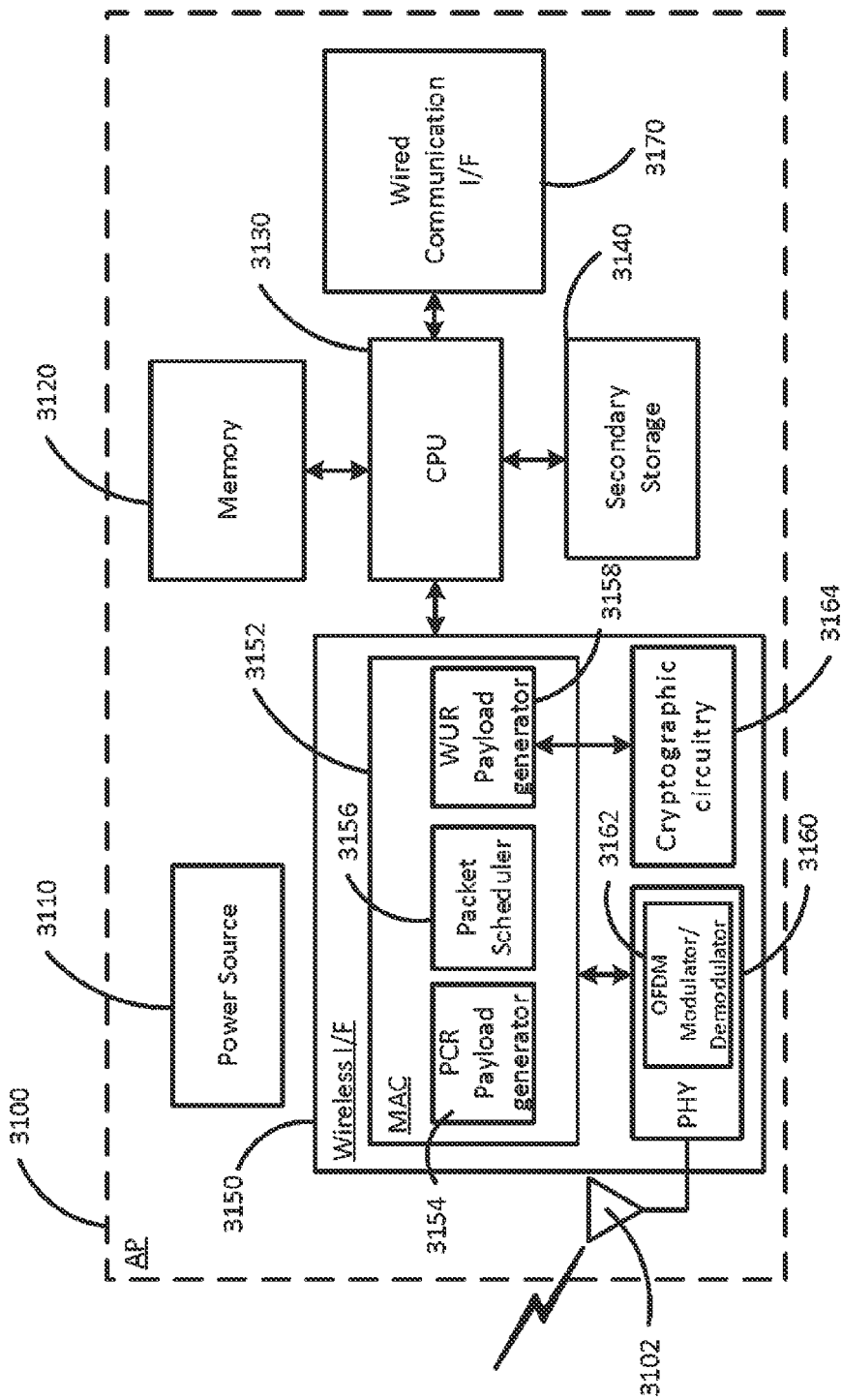
FIG. 31 is a detailed block diagram of an example AP that implements the disclosed transmission scheme.

FIG. 31 is a more detailed block diagram of an example AP 3100 capable of transmitting secure WUR PPDUs, which may be the AP 110 in FIG. 1. The AP 3100 comprises a Central Processing Unit (CPU) 3130 coupled to a memory 3120, a secondary storage 3140, one or more wireless communication interfaces 3150, as well as other wired communication interfaces 3170. The secondary storage 3140 may be a non-volatile computer readable storage medium that is used to permanently store pertinent instruction codes, data, etc.

At the time of start up, the CPU 3130 may copy the instruction codes as well as related data to the volatile memory 3120 for execution. The instruction code may be an operating system, user applications, device drivers, execution codes, etc., which are required for the operation of the AP 3100. The size of the instruction code and hence the storage capacity of both the secondary storage 3140 as well as the memory 3120 may be substantially bigger than that of the STA 3300 in FIG. 33.

The AP 3100 may also comprise a power source 3110 which in most cases may be a power mains but in some cases may also be some kind of high capacity battery for, e.g., a car battery. The wired communication interface 3170 may be an ethernet interface, or a powerline interface, or a telephone line interface, etc.

The wireless communication interface 3150 may comprise an interface for cellular communication, or an interface for short range communication protocols such as Zigbee, or it may be a WLAN interface. The Wireless interface 3150 may further comprise a MAC module 3152 and a PHY module 3160. The MAC module 3152 of an AP may be substantially more complicated than that of a STA 3300 in FIG. 33 and may comprise many sub-modules. Among other sub-modules, the MAC module 3152 may be comprised of a WUR Payload Generator 3158, a PCR payload generator 3154 and a Packet scheduler 3156. The PHY module 3160 is responsible for the conversion of the MAC module data to/from the transmission/reception signals and is further comprised of an OFDM modulator/demodulator 3162. The Cryptographic circuitry 3164 is used for the cryptographic computation to create secure WUR PPDUs and may also be used for encryption and decryption of protected 802.11 frames during the PCR mode. The wireless interface may also be coupled, via the PHY module, to one or more antennas 3102 that are responsible for the actual transmission/reception of the wireless communication signals on/from the wireless medium.

An AP as per the present disclosure may comprise many other components that are not illustrated, for sake of clarity, in FIG. 30 and FIG. 31. Only those components that are most pertinent to the present disclosure are illustrated.

Configuration of a STA

Figure 32:
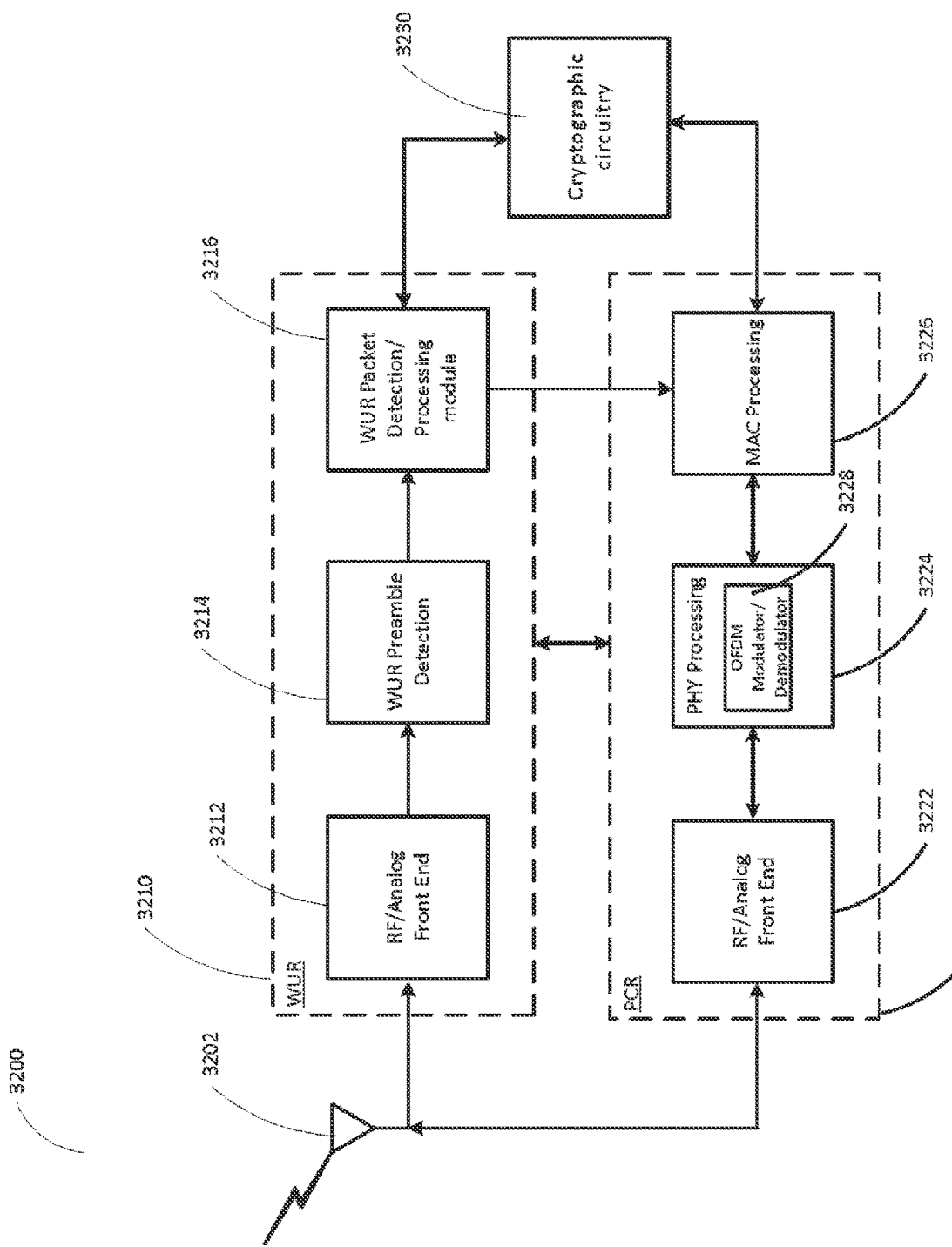
FIG. 32 is a simplified block diagram of an example WUR STA that implements the disclosed transmission scheme.

FIG. 32 illustrates a WUR STA 3200 that is capable of receiving secure WUR PPDUs and is equipped with two separate radios: a PCR 3220 for transmitting and receiving 802.11 OFDM signals and a WUR 3210 for receiving WUR signals.

The WUR 3210 is further comprised of several sub components such as an RF/Analog Front End 3212 responsible for receiving the analog radio signals from the antenna 3202, a WUR Preamble Detection module 3214 responsible for detecting and decoding the preamble portion of the wake up signal, and a WUR Packet Decoding/Processing module 3216 responsible for decoding and processing the payload portion of the wakeup signal.

The PCR 3220 is comprised of an RF/Analog front end 3222, a PHY processing unit 3230, and a MAC processing unit 3240. The RF/Analog front end 3222 is responsible for transfer of analog signals to/from the antenna 3202 and may comprise sub-components such as Automatic Gain Control (AGC), Low Pass Filter (LPF), Analog-to-Digital Converter (ADC) and so on. The PHY Processing unit 3230 is responsible for the processing of the PHY layer signals and is further comprised of an OFDM modulator/demodulator 3232 that is responsible for the modulation of transmit OFDM signals or demodulation of received OFDM signals.

The Cryptographic circuitry 3230 is used for the cryptographic computation to verify secure WUR PPDUs. A STA uses the Cryptographic circuitry 3230 to generate the Message Integrity Code (MIC) to be used for comparing against the MIC carried in secure WUR PPDUs. The Cryptographic circuitry 3230 may also be used for encryption and decryption of protected 802.11 frames during the PCR mode.

Figure 33:
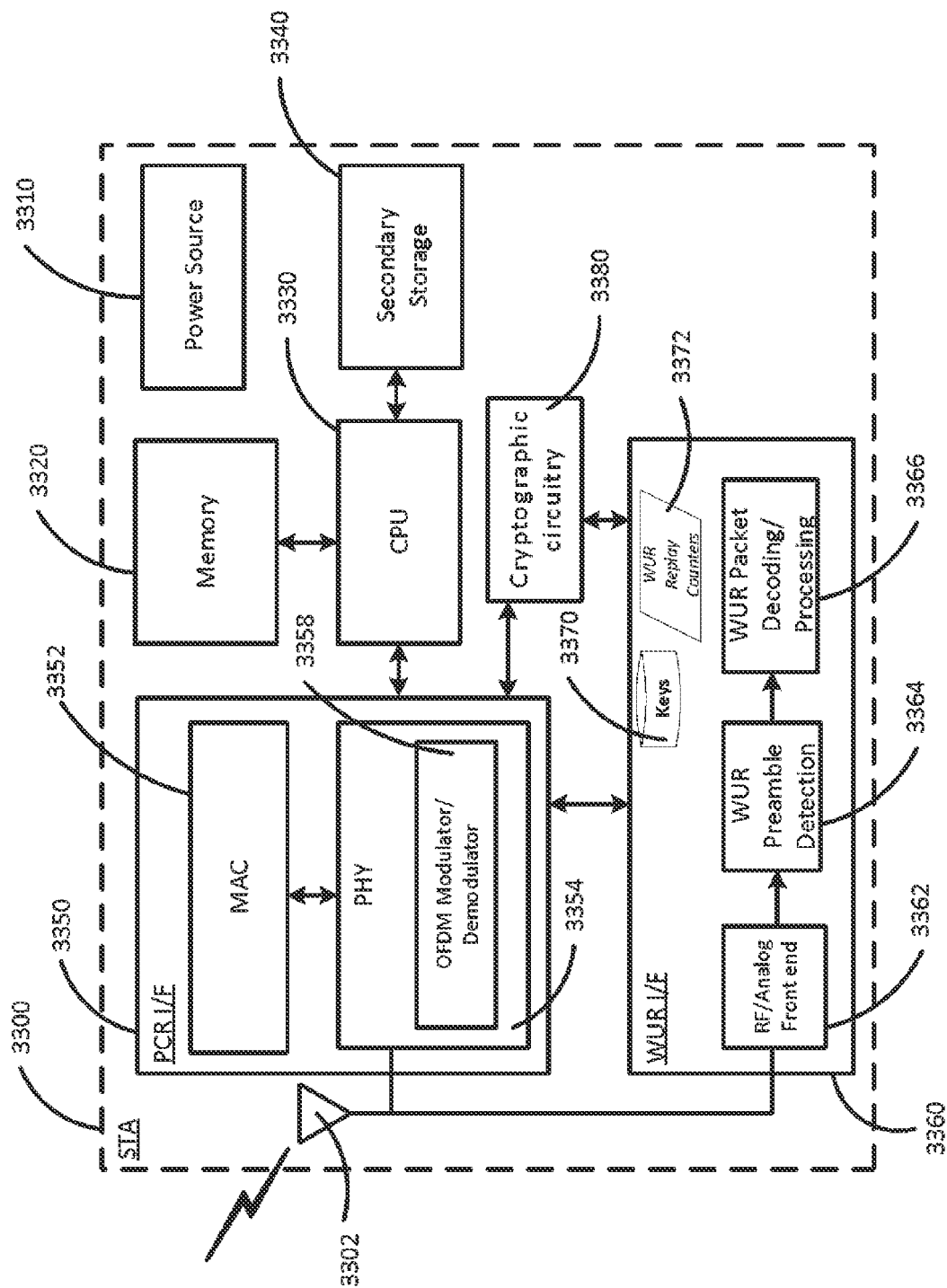
FIG. 33 is a detailed block diagram of an example WUR STA that implements the disclosed transmission scheme.

FIG. 33 is a detailed block diagram of an example STA 3300 that is capable of receiving secure WUR PPDUs as described in the present disclosure and may be STA 130 or STA 140 in FIG. 1. The STA 3300 is comprised of a Central Processing Unit (CPU) 3330 coupled to a memory 3320, a secondary storage 3340, one or more PCR interfaces 3350 as well a WUR interface 3360. Both the PCR interface 3350 and the WUR interface 3360 are connected to the same wireless antenna 3302. The secondary storage 3340 may be a non-volatile computer readable storage medium that is used to permanently store pertinent instruction codes, data, etc.

At the time of start up, the CPU 3330 may copy the instruction codes as well as related data to the volatile memory 3320 for execution. The instruction code may be an operating system, user applications, device drivers, execution codes, etc., which are required for the operation of the STA 3300. The STA 3300 may also comprise a power source 3310 for example a lithium ion battery or a coin cell battery, etc., or it may also be Mains electricity. The PCR interface 3350 may comprise an interface for cellular communication, or an interface for short range communication protocols such as Zigbee, or it may be a WLAN interface.

The PCR interface 3350 is comprised of a MAC module 3352 and a PHY module 3354 which is further comprised of an OFDM Modulator/Demodulator 3358.

The WUR interface 3360 is comprised of several sub components such as an RF/Analog Front End 3362 responsible for receiving the analog radio signals from the antenna 3302, a WUR Preamble Detection module 3364 responsible for detecting and decoding the preamble portion of the wake up signal, a WUR Packet Decoding/Processing module 3366 responsible for decoding and processing WUR frames which may involve verification of secure WUR frames. The WUR interface 3360 may also store the dedicated secret Keys 3370 used for the cryptographic computations for verification of secure WUR PPDUs. The WUR interface 3360 may also maintain independent WUR Replay Counters 3372 used to detect replay attacks. At any point in time, only one of the wireless interfaces is expected to be in operation, either the PCR interface 3350 or the WUR interface 3360.

The Cryptographic circuitry 3380 is used for the cryptographic computation to verify secure WUR PPDUs and may also be used for encryption and decryption of protected 802.11 frames during the PCR mode.

A STA as per the present disclosure may comprise many other components that are not illustrated, for sake of clarity, in FIG. 32 or FIG. 33. Only those components that are most pertinent to the present disclosure are illustrated.

In the foregoing embodiments, the present disclosure is configured with hardware by way of example, but may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

INDUSTRIAL APPLICABILITY

This disclosure can be applied to a wireless apparatus to recover from the state mismatch wherein the receiver's state of the active radio is different from the transmitter's record.

REFERENCE SIGNS LIST 110, 2200 AP
120, 130, 140, 3300 WUR STA
112, 122, 132, 142, 3000, 3150, 3220, 3350 PCR
124, 134, 144, 3210, 3360 WURx
3002, 3102, 3202, 3302 Antenna
3010, 3222, 3362 RF/Analog Front End
3020, 3160, 3224, 3354 PHY processing circuitry
3022, 3162, 3228, 3358 OFDM Modulator/Demodulator
3040, 3164, 3230, 3380 Cryptographic circuitry
3032, 3158 WUR Payload Generator
3030, 3152, 3226, 3352 MAC processing circuitry
3154 PCR Payload Generator
3156 Packet Scheduler
3110, 3310 Power Source
3120, 3320 Memory
3130, 3330 CPU 3140, 3340 Secondary Storage
3150 Wireless I/F
3170 Wired Communication I/F
3214, 3364 WUR Preamble Detection
3216, 3366 WUR Packet Decoding/Processing module
3370 Secret Keys
3372 WUR Replay Counter

ABBREVIATIONS

AP: Access point
CRC: Cyclic Redundancy Code
FCS: Frame Check Sequence
GMK: Group Master Key
GTK: Group Temporal Key
IGTK: Integrity Group Temporal Key
MAC: Medium access control
MIC: Message Integrity Code
OOK: ON-OFF Keying
OBSS: Overlapping Basic Service Set
OFDM: Orthogonal Frequency Division Multiplexing
PCR: Primary connectivity radio
PHY: Physical layer
PMK: Pairwise Master Key
PN: Packet Number
PPN: Partial Packet Number
PTK: Pairwise Temporal Key
PTSF: Partial Timing Synchronization Function (TSF)
RA: Receiver Address
RSNA: Robust Security Network Association
STA: Station
TA: Transmitter Address
TSF: Timing Synchronization Function
TK: Temporal Key
WUP: Wake-up packet
WUR: Wake-up radio
WURx: Wake-up receiver The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
   circuitry, which, in operation, uses both a temporal key and a first part of a Timing Synchronization Function (TSF) timer of the communication apparatus as inputs to compute a Message Integrity Code (MIC); and
   a transmitter, which, in operation, transmits, to a station associated with the communication apparatus, a frame with the MIC which controls the station to return from a power saving mode,
   wherein the frame includes a second part of the TSF timer of the communication apparatus for time adjustment and does not include the first part of the TSF timer of the communication apparatus for MIC verification, and the station receives the frame and uses a station TSF timer to generate a local MIC for comparison with the MIC included in the received frame.

2. The communication apparatus according to claim 1, wherein the circuitry uses the temporal Key to compute the MIC for protecting the frame which is an individually addressed frame.

3. The communication apparatus according to claim 1, wherein the temporal key is a integrity group temporal key, and the circuitry uses the integrity group temporal key to compute the MIC for protecting the frame which is a broadcast frame or a group addressed frame.

4. The communication apparatus according to claim 1, wherein the circuitry uses a transmitter address to compute the MIC.

5. The communication apparatus according to claim 1, wherein the MIC is included in a Frame Check Sequence (FCS) field of the frame.

6. The communication apparatus according to claim 1, wherein the MIC is computed from an identifier (ID) field of the frame.

7. A communication method implemented by a communication apparatus, the communication method comprising:
   using a temporal key and a first part of a Timing Synchronization Function (TSF) timer of the communication apparatus as inputs to compute a Message Integrity Code (MIC); and
   transmitting, to a station associated with the communication apparatus, a frame with the MIC which controls the station to return from a power saving mode,
   wherein the frame includes a second part of the TSF timer of the communication apparatus for time adjustment and does not include the first part of the TSF timer of the communication apparatus for MIC verification, and the station receives the frame and uses a station TSF timer to generate a local MIC for comparison with the MIC included in the received frame.

8. The communication method according to claim 7, wherein the temporal key is used to compute the MIC for protecting the frame which is an individually addressed frame.

9. The communication method according to claim 7, wherein the temporal key is a integrity group Temporal key, and the integrity group temporal key is used to compute the MIC for protecting the frame which is a broadcast frame or a group addressed frame.

10. The communication method according to claim 7, wherein a transmitter address is used to compute the MIC.

11. The communication method according to claim 7, wherein the MIC is included in a Frame Check Sequence (FCS) field of the frame.

12. The communication method according to claim 7, wherein the MIC is computed from an identifier (ID) field of the frame.

13. A station comprising:
   a receiver which, in operation, receive, from an Access Point (AP), a frame containing a Message Integrity Code (MIC) that is computed, by the access point, using a temporal key and a part of AP Time Synchronization Function (TSF) timer; the frame controlling the station to return from a power saving mode; and
   circuitry which, in operation, computes a local MIC using the temporal key and a station TSF timer, and if the computed local MIC matches the MIC of the frame, the circuitry authenticates the frame and returns from the power saving mode, wherein the station TSF timer is a part of local TSF timer maintained by the station.

14. The station according to claim 13, wherein the MIC is computed using a transmitter address of the AP.

15. The station according to claim 13, wherein the MIC is computed using a hash function.

16. The station according to claim 13, wherein the AP uses the temporal key to compute the MIC for protecting the frame which is an individually addressed frame.

17. The station according to claim 13, wherein the MIC is contained in a Frame Check Sequence (FCS) field of the frame.

18. The station according to claim 13, wherein the temporal key is indicated by a subfield of the frame.

\* \* \* \* \*